(12) United States Patent
Maeder et al.

(10) Patent No.: US 12,085,955 B2
(45) Date of Patent: Sep. 10, 2024

(54) METHODS, APPARATUS, AND ARTICLES OF MANUFACTURE TO SELECT TRACK PATHS FOR ONE OR MORE VEHICLES IN A FIELD

(71) Applicant: Deere & Company, Moline, IL (US)

(72) Inventors: Curtis A. Maeder, Johnston, IA (US); Qiang R. Liu, Urbandale, IA (US)

(73) Assignee: Deere & Company, Moline, IL (US)

(*) Notice: Subject to any disclaimer, the term of this patent is extended or adjusted under 35 U.S.C. 154(b) by 183 days.

(21) Appl. No.: 17/451,448

(22) Filed: Oct. 19, 2021

(65) Prior Publication Data

US 2023/0121416 A1 Apr. 20, 2023

(51) Int. Cl.
*G05D 1/00* (2024.01)
*A01B 69/00* (2006.01)
*A01B 79/00* (2006.01)
*B62D 15/02* (2006.01)

(52) U.S. Cl.
CPC ......... *G05D 1/0287* (2013.01); *A01B 69/004* (2013.01); *A01B 79/005* (2013.01); *B62D 15/02* (2013.01); *G05D 1/0088* (2013.01); *G05D 1/0212* (2013.01)

(58) Field of Classification Search
CPC .. G05D 1/0287; G05D 1/0088; G05D 1/0212; G05D 15/02; G05D 2201/0201; B62D 15/02; A01B 79/005; A01B 69/004
USPC .......................................................... 701/26
See application file for complete search history.

(56) References Cited

U.S. PATENT DOCUMENTS

| 5,646,845 A * | 7/1997 | Gudat ................. G05D 1/0011 |
| | | 701/41 |
| 6,907,336 B2 | 6/2005 | Gray et al. |
| 6,934,615 B2 | 8/2005 | Flann et al. |
| 7,010,425 B2 | 3/2006 | Gray et al. |
| 7,079,943 B2 | 7/2006 | Flann et al. |
| 7,110,881 B2 | 9/2006 | Gray et al. |
| 7,216,033 B2 | 5/2007 | Flann et al. |

(Continued)

FOREIGN PATENT DOCUMENTS

| EP | 2020169 | 2/2009 |
| WO | 2014105930 A1 | 7/2014 |

(Continued)

OTHER PUBLICATIONS

United States Patent and Trademark Office, "Advisory Action," issued in connection with U.S. Appl. No. 15/980,562, dated Mar. 16, 2021, 4 pages.

(Continued)

*Primary Examiner* — Yazan A Soofi
(74) *Attorney, Agent, or Firm* — Hanley, Flight & Zimmerman, LLC

(57) ABSTRACT

Methods, apparatus, systems, and articles of manufacture to select track paths for one or more vehicles in a field are disclosed. An example apparatus includes input interface circuitry to obtain a request for a first track path for a first vehicle, path instruction generation circuitry to, in response to the request, obtain information defining a plurality of track paths in a field, and select, based on the request, the first track path from the plurality of track paths, and update circuitry to update the information to indicate that the first track path is claimed by the first vehicle.

21 Claims, 14 Drawing Sheets

(56) References Cited

U.S. PATENT DOCUMENTS

| | | |
|---|---|---|
| 7,228,214 B2 | 6/2007 | Flann et al. |
| 7,505,848 B2 | 3/2009 | Flann et al. |
| 7,747,370 B2 | 6/2010 | Dix |
| 8,738,238 B2 | 5/2014 | Rekow |
| 9,227,474 B2 | 1/2016 | Liu |
| 9,826,673 B1 | 11/2017 | Ray et al. |
| 9,861,024 B2 | 1/2018 | Vogler et al. |
| 9,968,025 B2 | 5/2018 | Bunderson et al. |
| 9,974,225 B2 | 5/2018 | Bunderson et al. |
| 10,126,754 B2 | 11/2018 | Ogura et al. |
| 10,180,328 B2 | 1/2019 | Matthews |
| 10,188,021 B2 * | 1/2019 | Foster .................. G05D 1/0223 |
| 10,251,329 B2 | 4/2019 | Foster et al. |
| 10,394,238 B2 * | 8/2019 | Foster .................. G05D 1/0217 |
| 2008/0103694 A1 | 5/2008 | Dix et al. |
| 2008/0249692 A1 * | 10/2008 | Dix ...................... A01B 69/008 701/50 |
| 2009/0037041 A1 | 2/2009 | Senneff et al. |
| 2009/0216406 A1 | 8/2009 | Senneff et al. |
| 2012/0296529 A1 | 11/2012 | Peake et al. |
| 2013/0184944 A1 | 7/2013 | Missotten et al. |
| 2014/0081568 A1 | 3/2014 | Pieper et al. |
| 2015/0012181 A1 | 1/2015 | Brunnert et al. |
| 2016/0052546 A1 | 2/2016 | Arakane et al. |
| 2016/0174453 A1 * | 6/2016 | Matsuzaki ........... G05D 1/0295 701/2 |
| 2016/0227561 A1 | 8/2016 | Susitaival |
| 2016/0313737 A1 | 10/2016 | Berkemeier |
| 2016/0366815 A1 | 12/2016 | Guyette et al. |
| 2017/0144702 A1 | 5/2017 | Dang et al. |
| 2017/0202131 A1 | 7/2017 | Bunderson et al. |
| 2017/0300064 A1 | 10/2017 | Wolters et al. |
| 2018/0095476 A1 | 4/2018 | Madsen et al. |
| 2018/0310461 A1 | 11/2018 | Shinkai et al. |
| 2018/0373256 A1 * | 12/2018 | Runde .................. G05D 1/0219 |
| 2019/0146513 A1 | 5/2019 | Tomita et al. |
| 2019/0227561 A1 | 7/2019 | Hiramatsu |
| 2019/0353483 A1 | 11/2019 | Liu et al. |
| 2020/0064863 A1 | 2/2020 | Tomita et al. |
| 2020/0326707 A1 * | 10/2020 | Shashua ............... G06V 20/582 |
| 2021/0088354 A1 * | 3/2021 | Anderson ............... G06F 3/167 |

FOREIGN PATENT DOCUMENTS

| | | |
|---|---|---|
| WO | 2017192295 | 11/2017 |
| WO | 2018042853 | 3/2018 |
| WO | 2019136510 A1 | 7/2019 |

OTHER PUBLICATIONS

United States Patent and Trademark Office, "Final Office Action," issued in connection with U.S. Appl. No. 15/980,562, dated Dec. 3, 2020, 33 pages.

United States Patent and Trademark Office, "Final Office Action," issued in connection with U.S. Appl. No. 15/980,562, dated May 20, 2020, 22 pages.

European Patent Office, "Extended European Search Report," issued in connection with European Patent Application No. 19174325.1, dated Oct. 28, 2019, 7 pages.

Extended European Search Report and Written Opinion issued in European Patent Application No. 22197609.5, dated Feb. 23, 2023, in 08 pages.

United States Patent and Trademark Office, "Non-Final Office Action," issued in connection with U.S. Appl. No. 15/980,562, dated Dec. 22, 2021, 26 pages.

United States Patent and Trademark Office, "Final Office Action," issued in connection with U.S. Appl. No. 15/980,562, dated May 9, 2022, 36 pages.

* cited by examiner

000# METHODS, APPARATUS, AND ARTICLES OF MANUFACTURE TO SELECT TRACK PATHS FOR ONE OR MORE VEHICLES IN A FIELD

FIELD OF THE DISCLOSURE

This disclosure relates generally to vehicle steering and, more particularly, to methods, apparatus, and articles of manufacture to select track paths for one or more vehicles in a field.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, etc.) to help navigate without assistance, or with limited assistance, from human users.

SUMMARY

An example apparatus disclosed herein includes input interface circuitry to obtain a request for a first track path for a first vehicle. Path instruction generation circuitry is to, in response to the request, obtain information defining a plurality of track paths in a field, and select, based on the request, the first track path from the plurality of track paths. Update circuitry is to update the information to indicate that the first track path is claimed by the first vehicle.

An example non-transitory computer readable medium disclosed herein includes instructions that, when executed, cause at least one processor to at least obtain a request for a first track path for a first vehicle. The at least one processor is to obtain, in response to the request, information defining a plurality of track paths in a field, and select, based on the request, the first track path from the plurality of track paths. The at least one processor is to update the information to indicate that the first track path is claimed by the first vehicle.

An example apparatus disclosed herein includes means for obtaining to obtain a request for a first track path for a first vehicle, means for selecting to, in response to the request, obtain information defining a plurality of track paths in a field, and select, based on the request, the first track path the plurality of track paths, and means for updating to update the information to indicate that the first track path is claimed by the first vehicle.

Figure 1:
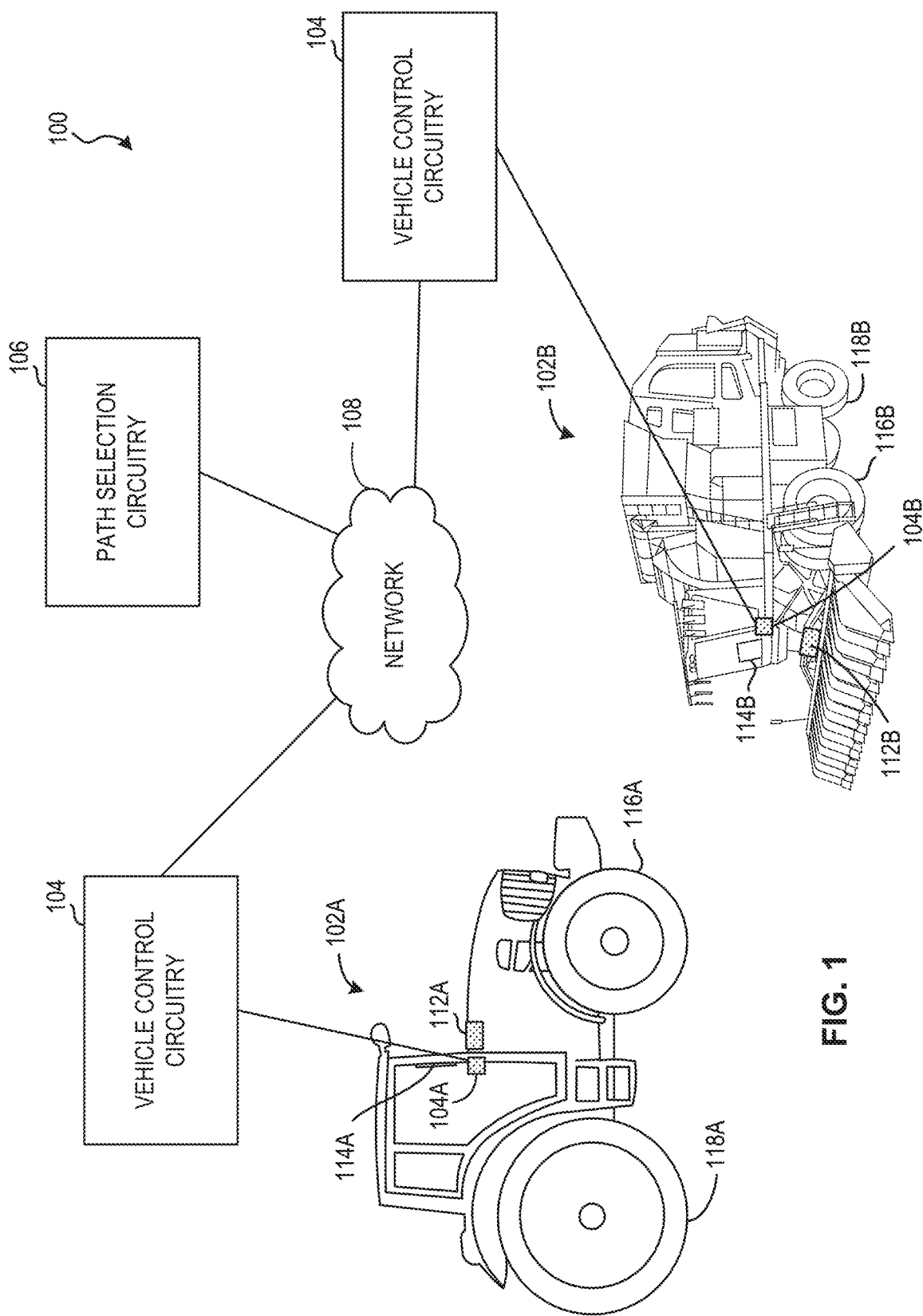
FIG. 1 is a schematic illustration of first and second example vehicles utilizing example vehicle control circuitry and example path selection circuitry in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Automation of agricultural vehicles is commercially desirable because automation can improve the accuracy with which operations are performed, reduce operator fatigue, improve efficiency, and accrue other benefits. Some automated vehicles include and/or are otherwise enabled for automation functionality, but the user may need to engage and/or disengage the automation functionality. For example, a user could switch a vehicle into an autonomous mode of operation, but the vehicle would not autonomously drive until the user presses a button or toggles a switch to "engage" automation. As such, the vehicle can be referred to as being in a "standby" autonomous mode of operation when automation is enabled but not engaged and in a "fully" autonomous mode of operation when automation is enabled and engaged. In either standby autonomous mode or fully autonomous mode, a user may be present within the vehicle.

Whether in standby autonomous mode or fully autonomous mode, autonomous vehicles include one or more controllers to ensure that the autonomous vehicles traverse terrain properly. In examples disclosed herein, automated vehicles follow guidance paths when in fully autonomous mode. A controller may have many different modes of operation including an acquisition mode of operation and a tracking mode of operation. As used herein, "tracking," "tracking mode," "tracking mode of operation," and/or their derivatives refer to following and/or tracking a guidance path (e.g., in a fully autonomous mode). As used herein, a "covered path" refers to a path along which a vehicle has previously travelled and/or is currently traversing. As used herein, a "claimed path," a "planned path," and/or a "future path" refers to a path that a vehicle plans to traverse, but that is not currently being traversed by the vehicle. As used herein, an "available path" refers to a path that is neither covered nor claimed by the vehicle.

Guidance paths (e.g., target paths) are used by a navigation and/or location apparatus (e.g., a Global Positioning System (GPS) receiver) and a controller in tracking mode to cause a vehicle to follow a prescribed path. In some examples, the prescribed path includes turns, curves, etc., for the vehicle to follow when operating in a field. Conventional controllers, sometimes referred to as guidance systems, allow users of a vehicle to specify a guidance path for the vehicle in the cab.

In some cases, multiple vehicles are to traverse and/or operate on a field. Some known guidance systems share location data between the vehicles, and the location data is used for steering the vehicles to avoid collisions. In some cases, paths of the vehicles are planned and preprogrammed onto the guidance systems prior to operation of the vehicles on the field. However, multiple vehicles performing the same task in a field may inefficiently cover the same areas and/or otherwise repeat operations on the same areas. Furthermore, some known guidance systems are unable to update the preprogrammed paths when one or more of the vehicles cease operation and/or one or more new vehicles are to begin operation, resulting in inefficient coverage of the field.

Furthermore, in conventional guidance systems, differences between operational widths of implements complicate determination of driving paths. For example, if a twelve-row planter is utilized to plant the crops, following the same guidance lines used with the twelve-row planter when using a sixteen-row cultivator/side-dress rig for a fertilization operation will result in crop rows that are not sprayed. Farmers will often have a plurality of implements with different widths, thus requiring operators to manually determine driving paths that are appropriate based on unique implement widths.

Examples disclosed herein enable selection of track paths to be traversed by one or more vehicles in a field. Example path selection circuitry disclosed herein generates and/or updates a map including information that defines a plurality of track paths in a field. In examples disclosed herein, available track paths are identified based on whether each of the plurality of track paths has been at least one of covered or claimed by at least one of the one or more vehicles in the field, and/or based on operational widths of the one or more vehicles. In response to a request from the vehicle, the example path selection circuitry selects the track path from the available track paths, and updates the map to indicate that the track path is claimed by the vehicle. In some examples, the path selection circuitry selects the track path based on calculated distances between the vehicle and each of the plurality of track paths, thereby reducing a distance to be travelled by the vehicle. In examples disclosed herein, the map can be continuously and/or periodically updated and shared between the one or more vehicles. Advantageously, examples disclosed herein enable dynamic path planning for the one or more vehicles, thereby reducing inefficiencies that may result from repeat operations on the field and/or missing coverage of some portions of the field.

FIG. 1 is a schematic illustration of an example environment 100 including a first example vehicle 102A and a second example vehicle 102B. In the illustrated example of FIG. 1, the first vehicle 102A utilizes first example vehicle control circuitry 104A, and the second vehicle 102B utilizes second example vehicle control circuitry 104B. In this example, the first and second vehicle control circuitry 104A, 104B are communicatively coupled to example path selection circuitry 106 via an example network 108. In other examples, the path selection circuitry 106 may be implemented locally by each of the first and second vehicle control circuitry 104A, 104B.

In the example of FIG. 1, the vehicle control circuitry 104A, 104B guides the first vehicle 102A and the second vehicle 102B, respectively, along one or more guidance paths (e.g., travel paths). The first vehicle 102A includes an example Global Positioning System (GPS) receiver 112A, an example user interface 114A, front wheels (one of which is shown at reference numeral 116A), and rear wheels (one of which is shown at reference numeral 118A). The second vehicle 102B includes an example Global Positioning System (GPS) receiver 112B, an example user interface 114B, front wheels (one of which is shown at reference numeral 116B), and rear wheels (one of which is shown at reference numeral 118B).

As illustrated and described herein, the structure and/or function of any one of the vehicle control circuitry 104B, the sensor 110B, the GPS receiver 112B, the user interface 114B, the front wheels (e.g., the front wheel 116B), and/or the rear wheels (e.g., the rear wheel 118B), may be the same as the corresponding component on the first vehicle 102A. Therefore, for example, description and/or illustration associated with the first vehicle control circuitry 104A of the first vehicle 102A can be considered to apply equally to the second vehicle control circuitry 104B of the second vehicle 102B.

As used herein, when referring to "the vehicle 102," it is to be understood that the description and/or illustration applies to both the first vehicle 102A and the second vehicle 102B. Similarly, when referring to any one or more of the components of the first vehicle 102A or the second vehicle 102B, if a component is discussed (e.g., the vehicle control circuitry 104, the GPS receiver 112, the user interface 114, the front wheel 116, the rear wheel 118, etc.), it is to be understood that the illustration and/or description applies to these respective parts on both of the first vehicle 102A and the second vehicle 102B.

In the example illustrated in FIG. 1, the first vehicle 102A is a tractor and the second vehicle 102B is a cotton stripper. However, the first vehicle 102A and the second vehicle 102B may be any type of vehicle (e.g., a tractor, front loader, harvester, cultivator, or any other suitable vehicle) configured to track a projected path and/or curved path. For example, the first vehicle 102A may be a tractor capable of automatically tracking a row of crops to harvest the row of crops. The first vehicle 102A and/or the second vehicle 102B may be a front wheel steer vehicle or a rear wheel steer vehicle. As used herein, a front wheel steer vehicle steers by pivoting its front wheels (such as the front wheel 116A) with respect to a vehicle frame, while a rear wheel steer vehicle steers by pivoting its rear wheels (such as the rear wheel 118B) with respect to a vehicle frame.

In some examples, the vehicle 102 may be implemented as an articulated vehicle that includes a different steering system as compared to front wheel and/or rear wheel steer vehicles. In examples disclosed herein, the vehicle 102 is equipped with the vehicle control circuitry 104 to control and/or otherwise command the vehicle 102 to track a predetermined path.

In the illustrated example of FIG. 1, the first vehicle 102A is implemented as a front wheel steer vehicle. As such, the first vehicle 102A turns in response to pivoting of the front wheel 116A. For example, if the user or an autonomous driving system decides to turn left, the front wheel 116A is pivoted to the left. The second vehicle 102B is implemented as a rear wheel steer vehicle. As such, the second vehicle 102B turns in response to pivoting of the rear wheel 118B. In examples disclosed herein, the front wheels 116A, 116B are located on a front wheel axle with one or more additional corresponding front wheels. Likewise, in examples disclosed herein, the rear wheels 118A, 118B are located on a rear wheel axle with one or more additional corresponding rear wheels.

In the illustrated example of FIG. 1, the GPS receiver 112 communicates with the vehicle control circuitry 104 and/or the path selection circuitry 106 to provide and/or otherwise transmit position data (e.g., a current position of the vehicle 102) thereto. In some examples, the GPS receiver 112 samples the current position of the vehicle 102 at a threshold interval. For example, every 0.1 seconds, the GPS receiver 112 may send the current position to the vehicle control circuitry 104 and/or the path selection circuitry 106 for use in generating an acquisition path.

In the illustrated example of FIG. 1, the user interface 114 enables an operator of the vehicle 102 to provide inputs to the vehicle control circuitry 104 and/or the path selection circuitry 106. In some examples, the user interface 114 is implemented by a liquid crystal display (LCD) touch screen such as a tablet, a computer monitor, etc. In the example of FIG. 1, the user interface 114 is an interactive display on which the operator may select and/or enter desired inputs (e.g., select a screen display, enter desired vehicle speed, select a sampling interval, power on and/or off the vehicle, etc.) before, during, and/or after operation of the vehicle 102. In some examples, the user interface 114 enables the operator to select a desired guidance path (e.g., a track path) from among one or more guidance paths preloaded in the vehicle control circuitry 104.

In some examples, the user interface 114 displays one or more maps generated by the path selection circuitry 106. For example, the user interface 114 can display a path map that illustrates locations of one or more vehicles operating in a field. In such an example, the path map includes paths (e.g., covered paths, claimed paths, and/or available paths) along which the one or more vehicles have travelled and/or are to travel. In some examples, the path map identifies the covered paths, the claimed paths, and/or the available paths using different colors, patterns, and/or line widths. Additionally or alternatively, the user interface 114 displays a coverage map, where the coverage map illustrates areas that have been covered and/or will be covered by the one or more vehicles.

In the illustrated example of FIG. 1, the vehicle control circuitry 104 is communicatively coupled to the path selection circuitry 106 via the network 108. In this example, the path selection circuitry 106 selects one or more paths to be tracked by the vehicle. In some examples, the path selection circuitry 106 receives an update request from the vehicle control circuitry 104, where the update request includes, in some examples, the current position of the vehicle 102 and/or a current (e.g., covered) path of the vehicle 102. In some examples, the path selection circuitry 106 selects (e.g., claims) a path for the vehicle 102 based on the current position and/or the current path of the vehicle 102. Additionally or alternatively, the path selection circuitry 106 obtains the claimed path of the vehicle 102 from the vehicle control circuitry 104. In some examples, the claimed path is selected (e.g., by a user) from one or more paths preloaded on the vehicle control circuitry 104. In some examples, the vehicle control circuitry 104 controls steering of the vehicle 102 to track the claimed path (e.g., by adjusting a rotation speed and/or direction of the front and/or rear wheels 116, 118).

Figure 2:
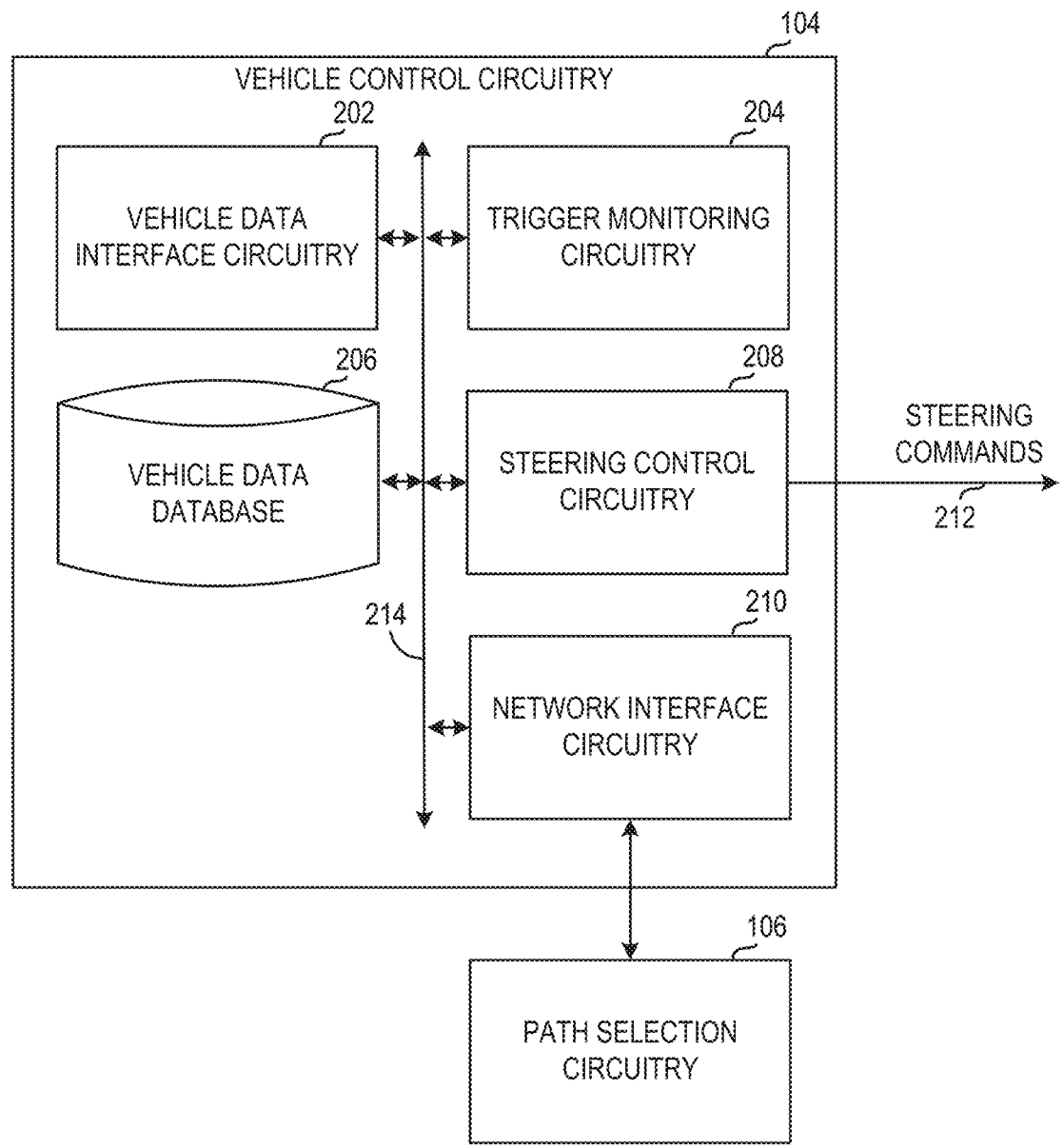
FIG. 2 is a block diagram of the example vehicle control circuitry of FIG. 1.

FIG. 2 is a block diagram of the example vehicle control circuitry 104 of FIG. 1. In the illustrated example of FIG. 2, the vehicle control circuitry 104 includes example vehicle data interface circuitry 202, example trigger monitoring circuitry 204, an example vehicle data database 206, example steering control circuitry 208, and example network interface circuitry 210. In the example of FIG. 2, the steering control circuitry 208 generates example steering commands 212, and the network interface circuitry 210 is communicatively coupled to the path selection circuitry 106 via the network 108 of FIG. 1. In the example of FIG. 2, any of the vehicle data interface circuitry 202, the trigger monitoring circuitry 204, the vehicle data database 206, the steering control circuitry 208, and/or the network interface circuitry 210 can communicate via an example communication bus 214.

In examples disclosed herein, the communication bus 214 may be implemented using any suitable wired and/or wireless communication. In additional or alternative examples, the communication bus 214 includes software, machine readable instructions, and/or communication protocols by which information is communicated among the vehicle data interface circuitry 202, the trigger monitoring circuitry 204, the vehicle data database 206, the steering control circuitry 208, and/or the network interface circuitry 210.

In the illustrated example of FIG. 2, the vehicle data database 206 stores data utilized and/or obtained by the vehicle control circuitry 104. In some examples, the vehicle data database 206 stores the current position of the vehicle 102, the current path of the vehicle 102, the claimed path of the vehicle 102, and/or one or more maps generated by the path selection circuitry 106. The example vehicle data database 206 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example vehicle data database 206 may be in any data format such as, for example, binary data, comma delimited data, tab delimited data, structured query language (SQL) structures, etc. While, in the illustrated example, the example vehicle data database 206 is illustrated as a single device, the example vehicle data database 206 and/or any other data storage devices described herein may be implemented by any number and/or type(s) of memories.

In the illustrated example of FIG. 2, the vehicle data interface circuitry 202 provides vehicle data to the trigger monitoring circuitry 204, the vehicle data database 206, the steering control circuitry 208, and/or to the network interface circuitry 210. In this example, the vehicle data interface circuitry 202 is communicatively coupled to the user interface 114 and/or the GPS receiver 112 of FIG. 1 to receive and/or otherwise obtain the vehicle data therefrom. For example, the vehicle data interface circuitry 202 obtains the current position and/or the current path of the vehicle 102 from the GPS receiver 112.

In some examples, the vehicle data interface circuitry 202 obtains user input data from the user interface 114. In some such examples, the user input data includes one or more identifiers associated with one or more paths selected by an operator of the vehicle 102 via the user interface 114. For example, the operator can select the one or more paths, via the user interface 114, from among one or more guidance paths stored in the vehicle data database 206. In some examples, the one or more guidance paths are stored in the vehicle data database 206 prior to operation of the vehicle 102. In some examples, the operator can modify the one or more paths (e.g., add a new guidance path, remove an existing guidance path, modify an existing guidance path, etc.) via the user interface 114. In other examples, the one or more guidance paths can be modified remotely via network communications received by the network interface circuitry 210. In some examples, the vehicle data interface circuitry 202 causes storage of the vehicle data (e.g., including the current position, the current path, and/or the identifiers) in the vehicle data database 206.

In some examples, the vehicle control circuitry 104 includes means for interfacing. For example, the means for interfacing may be implemented by the vehicle data interface circuitry 202. In some examples, the vehicle data interface circuitry 202 may be implemented by machine executable instructions such as that implemented by at least blocks 602, 604, and 616 of FIG. 6 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the vehicle data interface circuitry 202 is implemented by other hardware logic circuitry, hardware implemented state machines, and/or any other combination of hardware, software, and/or firmware. For example, the vehicle data interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the network interface circuitry 210 provides the vehicle data to and/or receives path instructions from the path selection circuitry 106. For example, the network interface circuitry 210 communicates with the path selection circuitry 106 via the network 108 of FIG. 1, and provides the vehicle data to the path selection circuitry 106 via the network 108. In some examples, the network interface circuitry 210 provides the vehicle data in an update request, where the update request indicates to the path selection circuitry 106 that a new path is to be claimed by the vehicle 102. In some examples, the update request includes an identifier corresponding to a path selected by an operator of the vehicle 102 via the user interface 114.

In some examples, the network interface circuitry 210 periodically (e.g., every 15 seconds, every 5 seconds, etc.) receives updated map information from the path selection circuitry 106. In some examples, the updated map information includes locations, covered paths, and/or claimed paths of one or more vehicles. In some examples, the network interface circuitry 210 provides the updated map information to the vehicle data database 206 for storage, and/or updates one or more maps stored in the vehicle data database 206 based on the updated map information.

In some examples, the vehicle control circuitry 104 includes means for providing. For example, the means for providing may be implemented by the network interface circuitry 210. In some examples, the network interface circuitry 210 may be implemented by machine executable instructions such as that implemented by at least blocks 610 and 612 of FIG. 6 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the network interface circuitry 210 is implemented by other hardware logic circuitry, hardware implemented state machines, and/or any other combination of hardware, software, and/or firmware. For example, the network interface circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the trigger monitoring circuitry 204 monitors the vehicle data received at the vehicle data interface circuitry 202 to determine whether a trigger event has occurred. In some examples, a trigger event can occur when the operator of the vehicle 102 claims a path via the user interface 114 and/or requests, via the user interface 114, a new path to be selected for the vehicle 102. In other examples, the trigger event occurs when the vehicle 102 is at a trigger location (e.g., at an end of a current path). For example, the trigger monitoring circuitry 204 determines that the trigger event has occurred when the vehicle 102 completes the current path and/or traverses a portion (e.g., 50%, 90%, etc.) of the current path. In some examples, the trigger monitoring circuitry 204 directs the network interface circuitry 210 to send the update request in response to the detecting a trigger event. In other examples, the trigger monitoring circuitry 204 directs the network interface circuitry 210 to send the update request periodically (e.g., every 15 seconds, every 5 seconds, etc.). In such examples, the update request includes a current location of the vehicle 102, a current path of the vehicle 102, one or more claimed paths of the vehicle 102, and/or a timestamp. In some examples, the path selection circuitry 106 continually updates the one or more maps generated and/or stored therein based on information from the one or more update requests.

In some examples, the vehicle control circuitry 104 includes means for triggering. For example, the means for triggering may be implemented by the trigger monitoring circuitry 204. In some examples, the trigger monitoring circuitry 204 may be implemented by machine executable instructions such as that implemented by at least blocks 606 and 608 of FIG. 6 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the trigger monitoring circuitry 204 is implemented by other hardware logic circuitry, hardware implemented state machines, and/or any other combination of hardware, software, and/or firmware. For example, the trigger monitoring circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the steering control circuitry 208 generates the steering commands 212 based on the current location of the vehicle 102 and/or the path instructions received from the path selection circuitry 106. For example, the steering commands 212 cause steering of wheels (e.g., the front wheel 116 and/or the rear wheel 118) of the vehicle 102. In some examples, the steering commands 212 control an angle at which the wheels turn and/or a rotation speed of the wheels to move the vehicle 102 along the one or more paths provided in the path instructions.

In some examples, the vehicle control circuitry 104 includes means for steering. For example, the means for steering may be implemented by the steering control circuitry 208. In some examples, the steering control circuitry 208 may be implemented by machine executable instructions such as that implemented by at least block 614 of FIG. 6 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the steering control circuitry 208 is implemented by other hardware logic circuitry, hardware implemented state machines, and/or any other combination of hardware, software, and/or firmware. For example, the steering control circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the vehicle control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example vehicle data interface circuitry 202, the example trigger monitoring circuitry 204, the example vehicle data database 206, the example steering control circuitry 208, the example network interface circuitry 210, and/or, more generally, the example vehicle control circuitry 104 of FIG. 2, may be implemented by hardware, software, firmware, and/or any combination of hardware, software, and/or firmware. Thus, for example, any of the example vehicle data interface circuitry 202, the example trigger monitoring circuitry 204, the example vehicle data database 206, the example steering control circuitry 208, the example network interface circuitry 210, and/or, more generally, the example vehicle control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example vehicle data interface circuitry 202, the example trigger monitoring circuitry 204, the example vehicle data database 206, the example steering control circuitry 208, and/or the example network interface circuitry 210 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle control circuitry 104 of FIG. 1 may include one or more elements, processes, and/or devices in addition to, or instead of, those illustrated in FIG. 2, and/or may include more than one of any or all of the illustrated elements, processes and devices.

Figure 3:
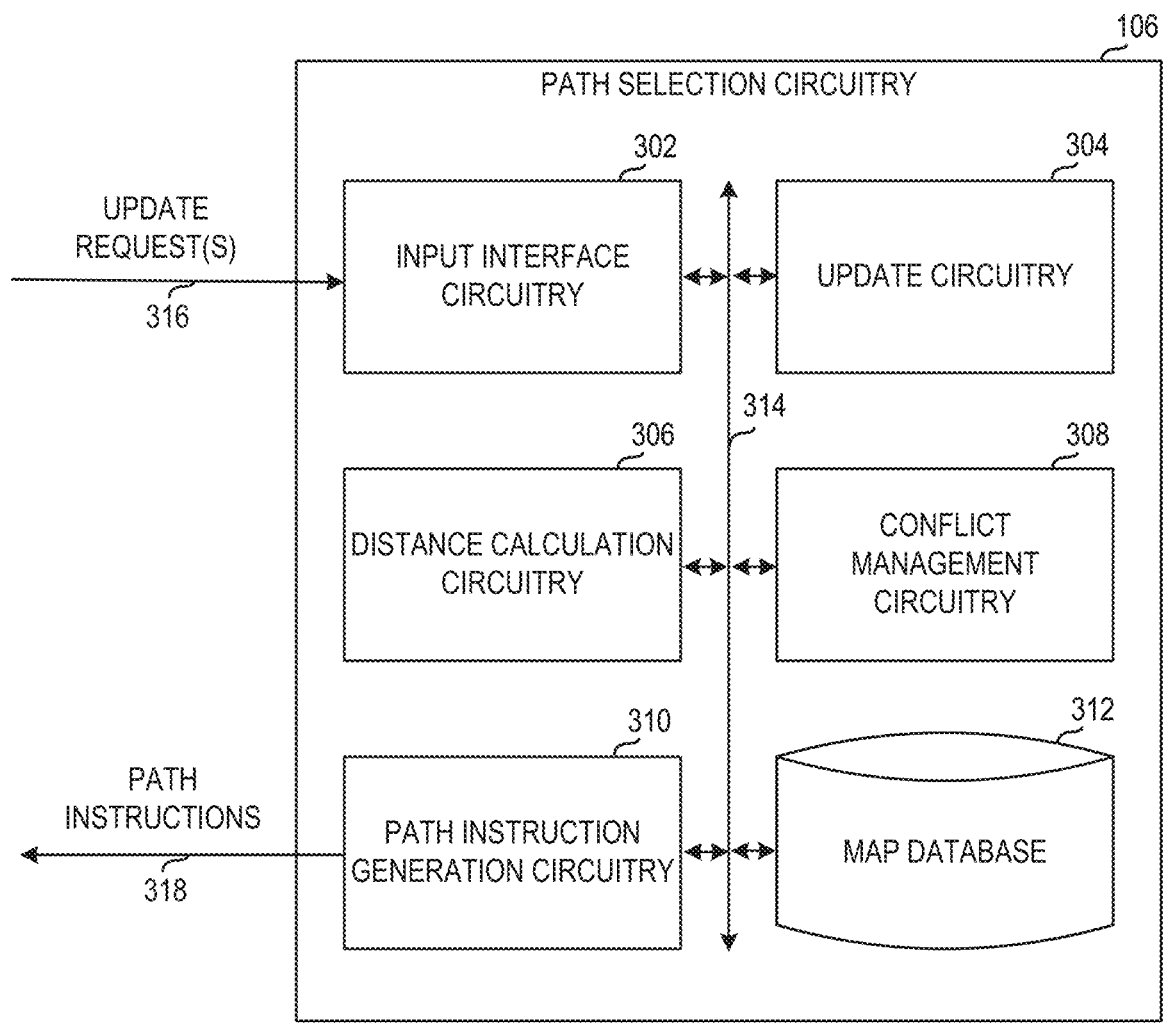
FIG. 3 is a block diagram of the example path selection circuitry of FIG. 1.

FIG. 3 is a block diagram of the example path selection circuitry 106 of FIG. 1. In this example, the path selection circuitry 106 is separate from the vehicle control circuitry 104 of FIGS. 1 and/or 2 and communicatively coupled to the vehicle control circuitry 104 via the network 108 of FIG. 1. However, in other examples, the path selection circuitry 106 can be implemented in the path selection circuitry 106. In some such examples, the vehicle 102 that utilizes the path selection circuitry 106 is a primary vehicle, and the vehicle 102 is communicatively coupled to one or more secondary vehicles to generate and provide path instructions thereto. Additionally or alternatively, the path selection circuitry 106 may be implemented locally by the vehicle control circuitry 104 of each of the one or more secondary vehicles. In some such examples, data can be shared between the vehicle control circuitry 104 of each of the primary vehicle and the one or more secondary vehicles.

In the illustrated example of FIG. 3, the path selection circuitry 106 includes example input interface circuitry 302, example update circuitry 304, example distance calculation circuitry 306, example conflict management circuitry 308, example path instruction generation circuitry 310, and an example map database 312. In the example of FIG. 3, any of the input interface circuitry 302, the update circuitry 304, the distance calculation circuitry 306, the conflict management circuitry 308, the path instruction generation circuitry 310, and/or the map database 312 can communicate via an example communication bus 314.

In examples disclosed herein, the communication bus 314 may be implemented using any suitable wired and/or wireless communication. In additional or alternative examples, the communication bus 314 includes software, machine readable instructions, and/or communication protocols by which information is communicated among the input interface circuitry 302, the update circuitry 304, the distance calculation circuitry 306, the conflict management circuitry 308, the path instruction generation circuitry 310, and/or the map database 312.

In the illustrated example of FIG. 3, the map database 312 stores a path map and/or a coverage map generated by the update circuitry 304. The example map database 312 of FIG. 3 is implemented by any memory, storage device and/or storage disc for storing data such as, for example, flash memory, magnetic media, optical media, solid state memory, hard drive(s), thumb drive(s), etc. Furthermore, the data stored in the example map database 312 may be in any data format such as, for example, binary data, comma delimited data, tab delimited data, structured query language (SQL) structures, etc. While, in the illustrated example, the example map database 312 is illustrated as a single device, the example map database 312 and/or any other data storage devices described herein may be implemented by any number and/or type(s) of memories.

In the illustrated example of FIG. 3, the input interface circuitry 302 is communicatively coupled to the network interface circuitry 208 to receive and/or otherwise obtain one or more example update requests 316 therefrom. In some examples, the update requests 316 include at least one of a current location of the vehicle 102, a first identifier corresponding to a current path of the vehicle 102, one or more second identifiers corresponding to one or more claimed paths of the vehicle 102, or a timestamp. In some examples, the timestamp is associated with a time at which the update request 316 was transmitted by the vehicle control circuitry 104, or a time at which the update request 316 was received by the path selection circuitry 106.

In some examples, the path selection circuitry 106 includes means for obtaining. For example, the means for obtaining may be implemented by the input interface circuitry 302. In some examples, the input interface circuitry 302 may be implemented by machine executable instructions such as that implemented by at least blocks 702, 704, and 706 of FIG. 7 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the input interface circuitry 302 is implemented by other hardware logic circuitry, hardware implemented state machines, and/or any other combination of hardware, software, and/or firmware. For example, the input interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the update circuitry 304 generates and/or updates one or more maps stored in the map database 312. In some examples, the one or more maps include at least one of a path map or a coverage map associated with one or more vehicles in a field. For example, the path map indicates paths that have been traversed by the one or more vehicles (e.g., covered paths), paths that are claimed by the one or more vehicles (e.g., claimed paths), and paths that have been neither claimed nor covered by the one or more vehicles (e.g., available paths). In some examples, the update circuitry 304 groups identifiers of the paths based on a path type (e.g., covered, claimed, or available).

In some examples, the coverage map identifies areas that have been covered by implements of the one or more vehicles (e.g., covered areas), areas that are claimed by the one or more vehicles (e.g., claimed areas), and areas that have been neither claimed nor covered by the one or more vehicles (e.g., available areas). For example, the update circuitry 304 obtains widths of the implements of the one or more vehicles from the update requests 316. The update circuitry 304 determines the covered areas by adding widths to the covered paths corresponding to the widths of the implements, and determines claimed areas by adding widths to the claimed paths corresponding to the widths of the implements. Additionally or alternatively, the path map and/or the coverage map include current locations of the one or more vehicles.

In some examples, the update circuitry 304 updates the path map and/or the coverage map based on information received in the update requests 316. For example, in response to the vehicle 102 claiming a first path corresponding to a first identifier, the update circuitry 204 updates the path map by switching the first path from an available path to a claimed path. In such an example, the update circuitry 204 also updates the coverage map by adding a width to the first path corresponding to a width of an implement of the vehicle 102, and identifying the area as a claimed area. In some examples, the update circuitry 204 determines whether one or more available paths are located within the claimed area. In some such examples, in response to determining that one or more available paths are located within the claimed area, the update circuitry 204 further updates the path map to identify the one or more available paths as claimed and/or covered paths.

In some examples, the path selection circuitry 106 includes means for updating. For example, the means for updating may be implemented by the update circuitry 304. In some examples, the update circuitry 304 may be implemented by machine executable instructions such as that implemented by at least block 718 of FIG. 7 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the update circuitry 304 is implemented by other hardware logic circuitry, hardware implemented state machines, and/or any other combination of hardware, software, and/or firmware. For example, the update circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the conflict management circuitry 308 manages conflicts that occur when one path is claimed by two or more vehicles. In one example, a path is claimed by the first vehicle 102A of FIG. 1 in a first update request, and the path is claimed by the second vehicle 104B of FIG. 1 in a second update request. In such an example, in response to determining that the path is claimed by both the first and second vehicles 102A, 102B, the conflict management circuitry 308 compares a first timestamp from the first update request to a second timestamp from the second update request. In response to determining that the first timestamp is earlier than the second timestamp, the conflict management circuitry 308 assigns the path to the first vehicle 102A. In other examples, in response to determining that the path is claimed by both the first and second vehicles 102A, 102B, the conflict management circuitry 308 directs the distance calculation circuitry 306 to calculate a first distance between the first vehicle 102A and a starting point of the path, and calculate a second distance between the second vehicle 102B and the starting point of the path. In such examples, the conflict management circuitry 308 assigns the path to the first vehicle 102A or the second vehicle 102B corresponding to the lesser one of the first distance or the second distance.

In some examples, in response to assigning the path to the first vehicle 102A, the conflict management circuitry 308 directs the path instruction generation circuitry 310 to select a different path for the second vehicle 102B. In such examples, the path instruction generation circuitry 310 instructs the second vehicle control circuitry 104A to steer the second vehicle 102 along the different path. Additionally or alternatively, the path instruction generation circuitry 310 provides an indication to the user interface 114B of the second vehicle 102B, where the indication instructs the operator of the second vehicle 102B to select a different path via the user interface 114B.

In some examples, the path selection circuitry 106 includes means for managing conflict. For example, the means for managing conflict may be implemented by the conflict management circuitry 308. In some examples, the conflict management circuitry 308 may be implemented by machine executable instructions such as that implemented by at least blocks 708, 710, and 712 of FIG. 7 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the conflict management circuitry 308 is implemented by other hardware logic circuitry, hardware implemented state machines, and/or any other combination of hardware, software, and/or firmware. For example, the conflict management circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the path instruction generation circuitry 310 generates example path instructions 318 and provides the path instructions 318 to the vehicle 102 for use in generating the steering commands 212 of FIG. 2. In some examples, the path instructions 318 include one or more paths and/or identifiers of the one or more paths to be traversed by the vehicle 102. In some examples, the path instruction generation circuitry 310 selects the one or more paths in the path instructions 318 based on vehicle data in the update requests 316. For example, when the update request 316 indicates that the vehicle 102 claims a first path corresponding to a first identifier, the update circuitry 304 updates the path and/or coverage maps stored in the map database 312 to reflect that the first path is claimed by the vehicle 102. In such examples, the path instruction generation circuitry 310 sends the updated path and/or coverage maps in the path instructions 318 to the vehicle 102. In some examples, when the conflict management circuitry 308 determines that the first path is claimed by a different vehicle, the path instruction generation circuitry 310 instructs, via the path instructions 318, the operator of the vehicle 102 to select a different path for the vehicle 102.

In some examples, when the update request 316 includes a request to select and/or otherwise claim a new path for the vehicle 102, the path instruction generation circuitry 310 selects the new path based on vehicle data from the update request 316. For example, the path instruction generation circuitry 310 determines a current location of the vehicle 102 based on the vehicle data, and obtains at least one of the path map or the coverage map from the map database 312. The path instruction generation circuitry 310 identifies available paths based on the at least one of the path map or the coverage map, and selects the new path from the available paths based on the current location of the vehicle 102. In such examples, the path instruction generation circuitry 310 provides the new path and/or an identifier of the new path in the path instructions 318, and the vehicle control circuitry 104 of the vehicle 102 steers the vehicle 102 to travel to and/or traverse the new path. In some examples, the path instruction generation circuitry 310 also provides the path map and/or the coverage map in the path instructions 318 to the vehicle control circuitry 104 for storage therein.

In some examples, the path selection circuitry 106 includes means for selecting. For example, the means for selecting may be implemented by the path instruction generation circuitry 310. In some examples, the path instruction generation circuitry 310 may be implemented by machine executable instructions such as that implemented by at least blocks 714, 716, and 720 of FIG. 7 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the path instruction generation circuitry 310 is implemented by other hardware logic circuitry, hardware implemented state machines, and/or any other combination of hardware, software, and/or firmware. For example, the path instruction generation circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 3, the distance calculation circuitry 306 calculates distances between the vehicle 102 and one or more paths in the path map. For example, when the path instruction generation circuitry 310 is to select a new path for the vehicle 102, the distance calculation circuitry 306 calculates distances between the current location of the vehicle 102 and the available paths, and the path instruction generation circuitry 310 selects the new path from the available paths that corresponds to a smallest one of the calculated distances. Additionally or alternatively, when the conflict management circuitry 308 determines that one or more vehicles (e.g., the first vehicle 102A and the second vehicle 102B) claimed a given path, the distance calculation circuitry 306 calculates a first distance between the first vehicle 102A and the given path, and a second distance between the second vehicle 102B and the given path. In some such examples, the conflict management circuitry 308 assigns the given path to the first vehicle 102A or the second vehicle 102B corresponding to a lesser one of the first distance or the second distance.

In some examples, the path selection circuitry 106 includes means for calculating. For example, the means for calculating may be implemented by the distance calculation circuitry 306. In some examples, the distance calculation circuitry 306 may be implemented by machine executable instructions such as that implemented by at least blocks 710 and 714 of FIG. 7 executed by processor circuitry, which may be implemented by the example processor circuitry 1012 of FIG. 10, the example processor circuitry 1200 of FIG. 12, and/or the example Field Programmable Gate Array (FPGA) circuitry 1300 of FIG. 13. In other examples, the path instruction generation circuitry 310 is implemented by other hardware logic circuitry, hardware implemented state machines, and/or any other combination of hardware, software, and/or firmware. For example, the path instruction generation circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the path selection circuitry 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example input interface circuitry 302, the example update circuitry 304, the example distance calculation circuitry 306, the example conflict management circuitry 308, the example path instruction generation circuitry 310, the example map database 312, and/or, more generally, the example path selection circuitry 106 of FIG. 3, may be implemented by hardware, software, firmware, and/or any combination of hardware, software, and/or firmware. Thus, for example, any of the example input interface circuitry 302, the example update circuitry 304, the example distance calculation circuitry 306, the example conflict management circuitry 308, the example path instruction generation circuitry 310, the example map database 312, and/or, more generally, the example path selection circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example input interface circuitry 302, the example update circuitry 304, the example distance calculation circuitry 306, the example conflict management circuitry 308, the example path instruction generation circuitry 310, and/or the example map database 312 is/are hereby expressly defined to include a non-transitory computer readable storage device or storage disk such as a memory, a digital versatile disk (DVD), a compact disk (CD), a Blu-ray disk, etc., including the software and/or firmware. Further still, the example path selection circuitry 106 of FIG. 1 may include one or more elements, processes, and/or devices in addition to, or instead of, those illustrated in FIG. 3, and/or may include more than one of any or all of the illustrated elements, processes and devices.

Figure 4:
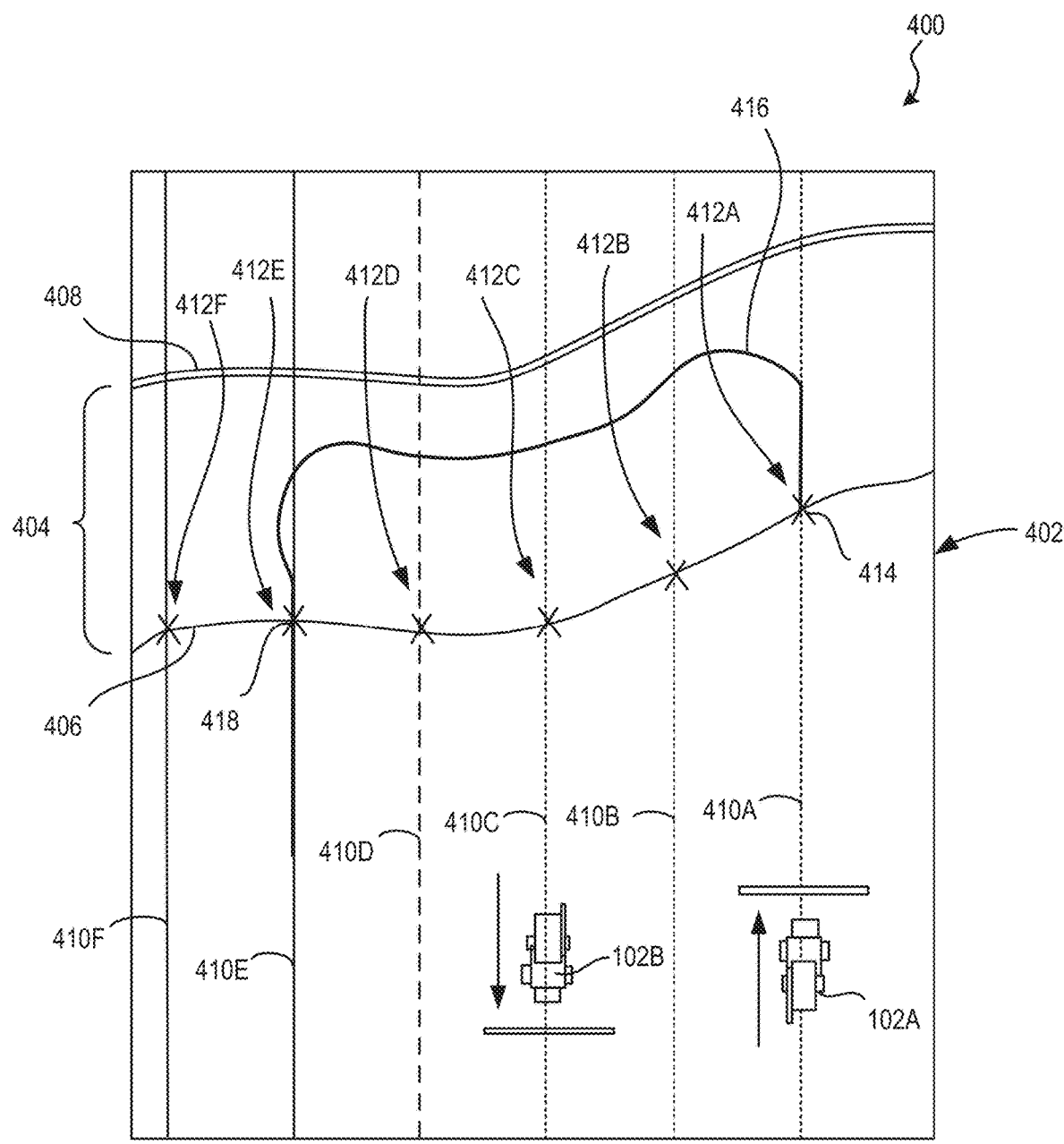
FIG. 4 illustrates an example path map generated by the example path selection circuitry of FIG. 3.

FIG. 4 illustrates an example path map 400 generated by the example path selection circuitry 106 of FIGS. 1 and/or 3. In some examples, the path map 400 can be displayed via the user interface 114 of FIG. 1. In some examples, the example update circuitry 304 of FIG. 3 generates the path map 400 corresponding to an example work area 402 based on GPS data collected by the first sensor 112A of the first vehicle 102A and/or the second sensor 112B of the second vehicle 102B. In the illustrated example of FIG. 4, the work area 402 includes an example headland region 404 defined by an example interior boundary 406 and an example exterior boundary 408. The path map 400 defines paths (e.g., track paths) 410 along which the first and second vehicles 102A, 102B are to travel. In this example, the paths 410 are preloaded on the path selection circuitry 106. In some examples, path generation circuitry may be implemented by the vehicle control circuitry 104 of FIG. 1 and/or by the path selection circuitry 106 to generate the paths 410 while the first and second vehicles 102A, 102B operate on the work area 402. In this example, the paths 410 are generally straight and parallel. In other examples, a different shape and/or spacing of the paths 410 may be used instead. In this example, the paths 410 intersect the interior boundary 406 at example path ends 412. In some examples, the path ends 412 correspond to trigger locations of the first and second vehicles 102A, 102B.

In the illustrated example of FIG. 4, a first example path 410A is covered by the first vehicle 102A, and example second and third paths 410B, 410C are covered by the second vehicle 102B. For example, the third path 410C is covered by the second vehicle 102B in a current pass, and the second path 410B was covered by the second vehicle 102B in a previous pass. Furthermore, in the example of FIG. 4, a fourth example path 410D is claimed by the second vehicle 102B, and fifth and sixth example paths 410E, 410F are available. In some examples, the covered paths (e.g., the first, second, and third paths 410A, 410B, 410C), the claimed paths (e.g., the fourth path 410D), and the available paths (e.g., the fifth and sixth paths 410E, 410F) may be identified by an operator of the vehicle 102 (e.g., the first vehicle 102A or the second vehicle 102B) based on the line width, color, and/or pattern in the path map 400 displayed by the user interface 114. In some examples, the path map 400 is stored in the map database 312 of FIG. 3 and/or the vehicle data database 206 by storing coordinates corresponding to locations of the paths 410. In some examples, for each of the paths 410, the map database 312 and/or the vehicle data database 206 store a path identifier corresponding to a particular path, a state of the path (e.g., whether the path is covered, claimed, or available), and/or a vehicle identifier associated with the path, where the vehicle identifier corresponds to one of the first vehicle 102A or the second vehicle 102B that has at least one of covered or claimed the path.

In the illustrated example of FIG. 4, the first vehicle control circuitry 104A of the first vehicle 102A sends the update request 316 to the path selection circuitry 106 of FIG. 3 to select a new path for the first vehicle 102A. In some examples, the first vehicle control circuitry 104A sends the update request 316 when the first vehicle 102A is at a trigger location. In this example, the trigger location is at an example first end point 412A of the first path 410A being traversed by the first vehicle 102A. In response to receiving the update request 316, the path selection circuitry 106 determines, based on the path map 400, that the fifth and sixth paths 410E, 410F are available. In such an example, the path selection circuitry 106 calculates a first distance between the first vehicle 102A and the fifth path 410E, and calculates a second distance between the first vehicle 102A and the sixth path 410F. In response to determining that the fifth path 410E is closer to the first vehicle 102A compared to the sixth path 410F (e.g., the first distance is less than the second distance), the path selection circuitry 106 selects the fifth path 410E as the next path for the first vehicle 102A. In other examples, the path selection circuitry 106 selects the fifth path 410E in response to user input via the user interface 114 of FIG. 1.

In the illustrated example of FIG. 4, in response to the fifth path 410E being selected as the next path for the first vehicle 102A, the path selection circuitry 106 updates the path map 400 to indicate that the fifth path 410E is claimed by the first vehicle 102A. For example, the path selection circuitry 106 updates the path map 400 by changing the color, line width, and/or line pattern of the fifth path 410E. In some examples, the path selection circuitry 106 sends the updated path map 400 and/or an identifier of the fifth path 410E in the path instructions 318 to the first vehicle control circuitry 104A, and instructs the vehicle control circuitry 104A to steer the first vehicle 102A to and along the fifth path 410A.

In this example, the first vehicle control circuitry 104A selects the first end point 412A as an example starting position 414 for generating an example acquisition path 416 between the first path 410A and the fifth path 410E. For example, the first end point 412A is a location at which the first path 410A intersects the interior boundary 406. Similarly, in some examples, the first vehicle control circuitry 104A determines example second, third, fourth, fifth, and sixth end points 412B, 412C, 412D, 412E, 412F of the second, third, fourth, fifth, and sixth paths 410B, 410C, 410D, 410E, 410F, respectively, based on locations at which the second, third, fourth, fifth, and sixth paths 410B, 410C, 410D, 410E, 410F intersect the interior boundary 406. In the illustrated example of FIG. 4, the first vehicle control circuitry 104A can select and/or generates acquisition paths between the path ends 412, where the acquisition paths are within the headland region 404. In this example, the first vehicle control circuitry 104A selects and/or generates the acquisition path 416 between the starting position 414 (e.g., corresponding to the first end point 412A) and an example ending position 418 (e.g., corresponding to the fifth end point 412E). Furthermore, the first vehicle control circuitry 104A generates the steering commands 212 of FIG. 2 to steer the first vehicle 102A along the acquisition path 416 from the first path 410A to the fifth path 410E.

Figure 5A:
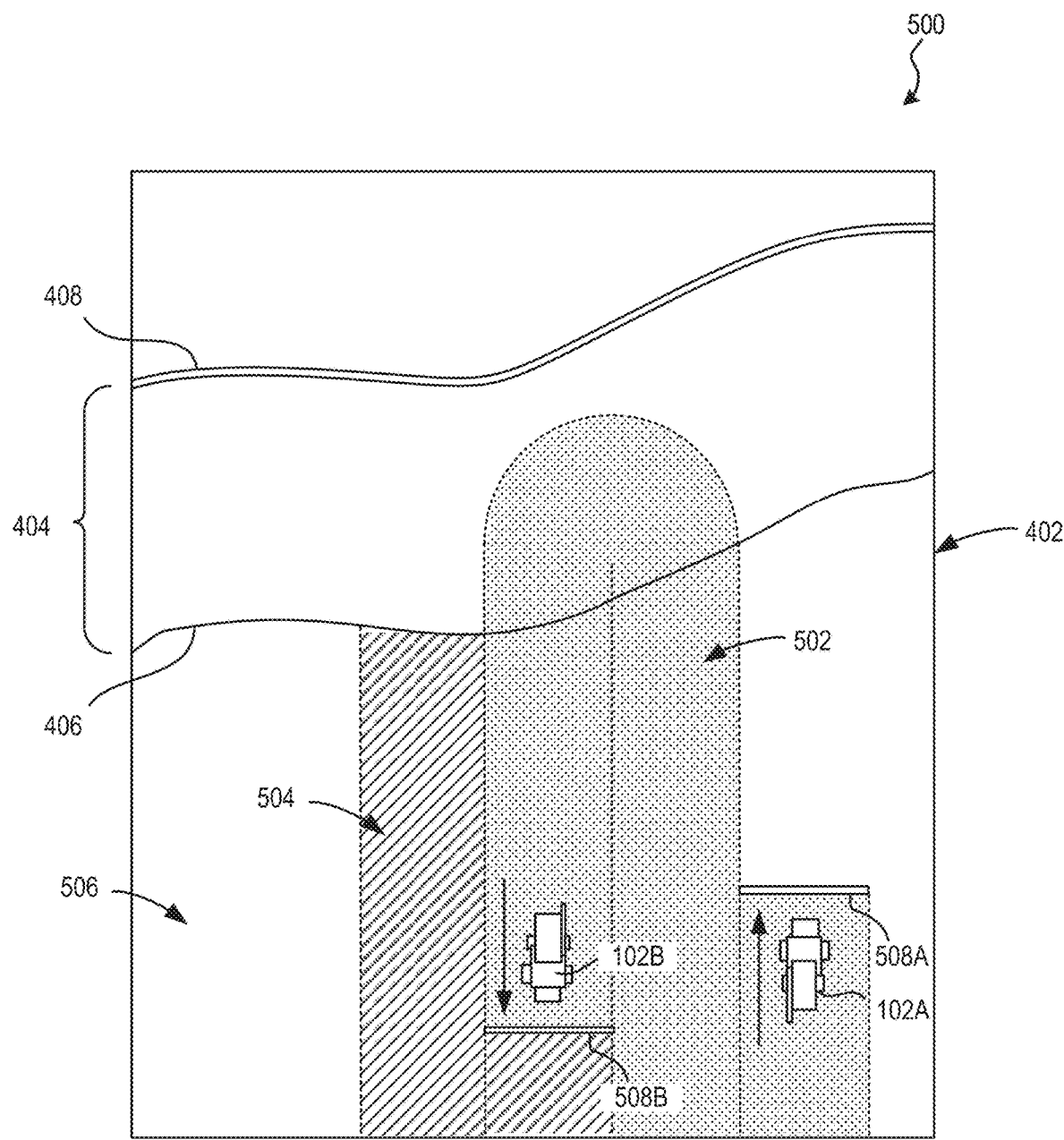
FIG. 5A illustrates an example coverage map generated by the example path selection circuitry of FIG. 3.

FIG. 5A illustrates an example coverage map 500 generated by the example path selection circuitry 106 of FIGS. 1 and/or 3. In some examples, the coverage map 500 can be displayed via the user interface 114 of FIG. 1. In some examples, the example update circuitry 304 of FIG. 3 generates the coverage map 500 corresponding to the work area 402 shown in the path map 400 of FIG. 4. In the illustrated example of FIG. 5, the coverage map 500 includes an example covered area 502 corresponding to a first shaded portion of the work area 402 that has been covered (e.g., traversed) by the first vehicle 102A and/or the second vehicle 102B. Furthermore, the coverage map 500 includes an example claimed area 504 corresponding to a second shaded portion of the work area 402 that has been claimed by at least one of the first vehicle 102A or the second vehicle 102B. In this example, an example available area 506 corresponds to an unshaded portion of the work area 402 that has been neither covered nor claimed by at least one of the first vehicle 102A or the second vehicle 102B.

In the illustrated example of FIG. 5A, the path selection circuitry 106 determines the covered area 502 and the claimed area 504 based on a first example implement 508A of the first vehicle 102A and a second example implement 508B of the second vehicle 102B. For example, the path selection circuitry 106 determines a first width of the first implement 508A and the second width of the second implement 508B based on user input via the user interface 114. In other examples, values corresponding to the first and second widths are preloaded in the path selection circuitry 106. In some examples, to determine the covered area 502, the path selection circuitry 106 determines a first area covered by the first implement 508A when the first vehicle 102A travels along the first path 410A of FIG. 4, and determines a second area covered by the second implement 508B when the second vehicle 102B travels along the second and third paths 410B, 410C of FIG. 4. Stated differently, the covered area 502 corresponds to traversed portions of the paths 410 of FIG. 4 having a width (e.g., the first width of the first implement 508A and/or the second width of the second implement 508B). Similarly, in the illustrated example of FIG. 5A, the path selection circuitry 106 determines the claimed area 504 by determining an area to be covered by the second implement 508B when the second vehicle 102B traverses a claimed path (e.g., the fourth path 410D of FIG. 4). In some examples, the path selection circuitry 106 selects and/or otherwise claims a next path for the first vehicle 102A based on the available area 506, where the available area 506 corresponds to one or more portions of the work area 402 not including the covered area 502 or the claimed area 506.

Figure 5B:
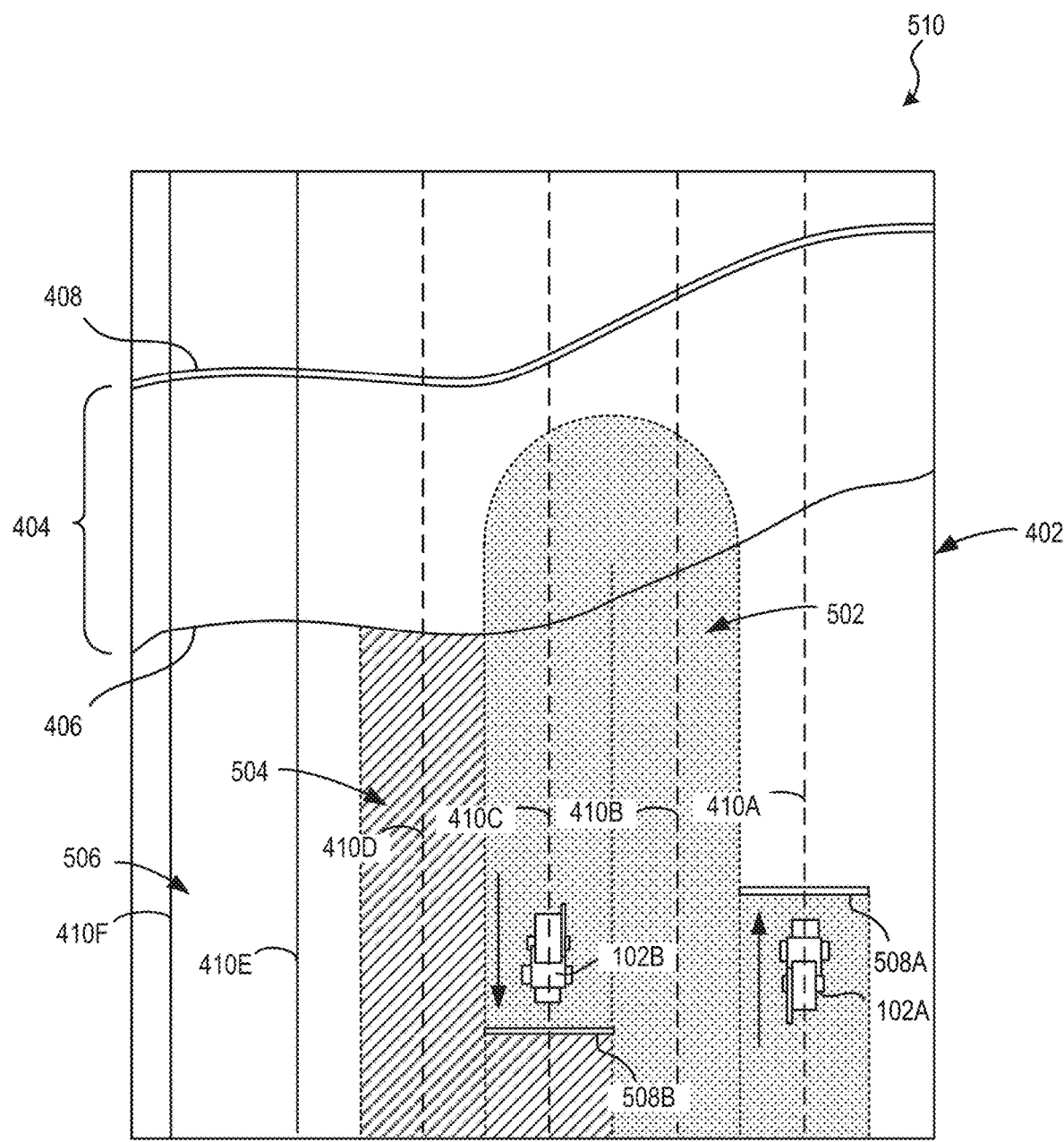
FIG. 5B illustrates a first example combined map based on the example path map of FIG. 4 and the example coverage map of FIG. 5A.

FIG. 5B illustrates a first example combined map 510 generated by the example path selection circuitry 106 of FIGS. 1 and/or 3. In the illustrated example of FIG. 5B, the first combined map 510 includes the paths 410 of FIG. 4 projected onto the coverage map 500 of FIG. 5A. In some examples, the first combined map 510 can be displayed via the user interface 114 of FIG. 1. In this example, the path selection circuitry 106 selects and/or otherwise claims a next path for the first vehicle 102A based on the first combined map 510. In some examples, the path selection circuitry 106 determines whether each of the paths 410 is available based on the covered area 502 and/or the claimed area 504. For example, in response to determining that the first, second, third, and fourth paths 410A, 410B, 410C, 410D are located within at least one of the covered area 502 or the claimed area 504, the path selection circuitry 106 determines that the first, second, third, and fourth paths 410A, 410B, 410C, 410D are unavailable paths and, thus, determines that the fifth and sixth paths 410E, 410F are available paths. In some such examples, the path selection circuitry 106 removes the unavailable paths from the first combined map 510. In the illustrated example of FIG. 5B, in response to receiving the update request 316 of FIG. 3 from the first vehicle control circuitry 104A of the first vehicle 102A, the path selection circuitry 106 selects the next path for the first vehicle 102A from the available paths (e.g., the fifth path 410E and the sixth path 410F), and provides the selected path and/or the first combined map 510 to the first vehicle control circuitry 104A via the path instructions 318 of FIG. 3.

Figure 5C:
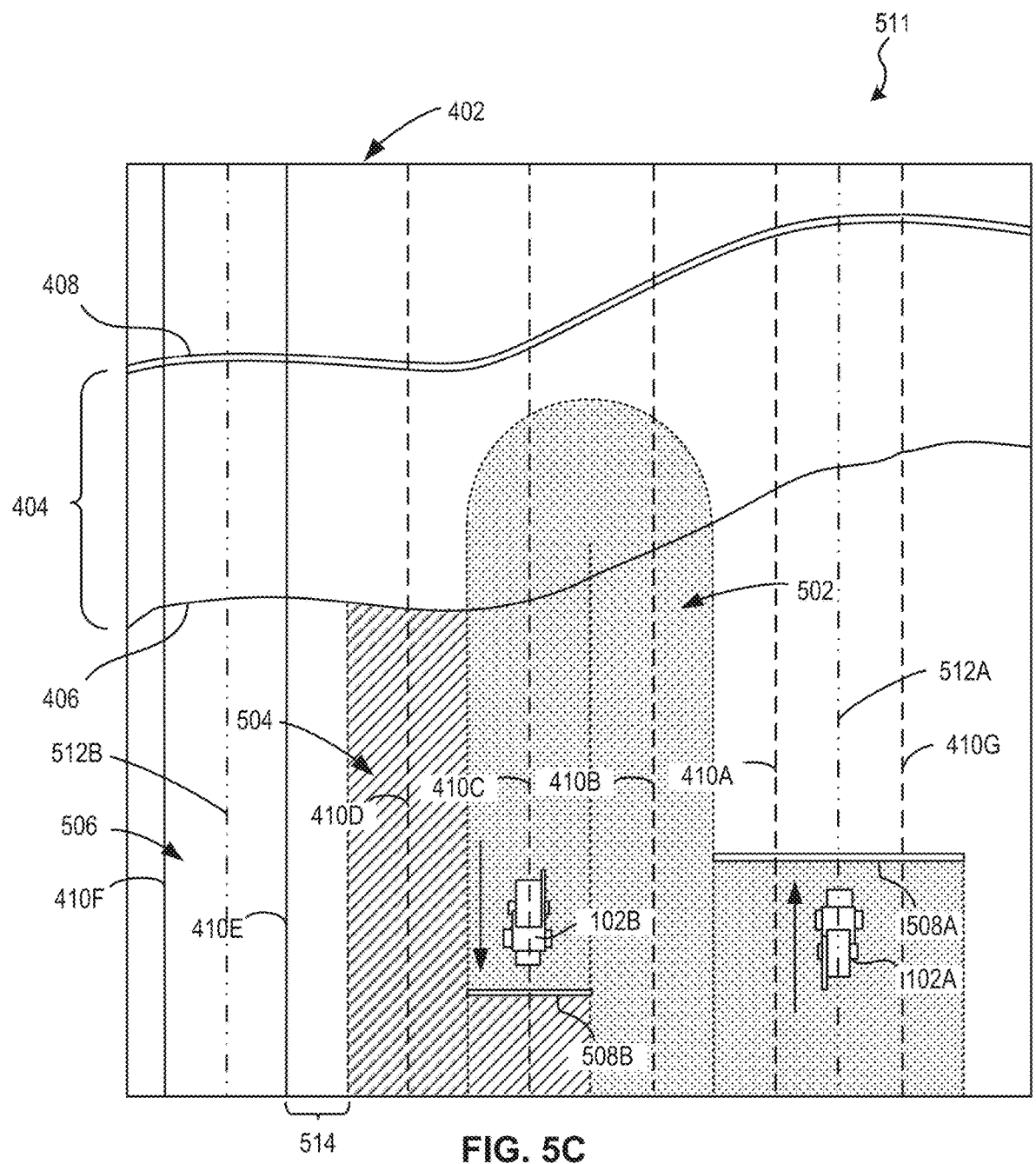
FIG. 5C illustrates a second example combined map for the first and second example vehicles having different operational widths.

FIG. 5C illustrates a second example combined map 511 generated by the example path selection circuitry 106 of FIGS. 1 and/or 3 for the first and second vehicles 102A, 102B having different operational widths. In examples disclosed herein, the first implement 508A of the first vehicle 102A has a first operational width, and the second implement 508B of the second vehicle 102B has a second operational width. In this example, the first operational width of the first implement 508A is approximately double the second operational width of the second implement 508B. As such, the first vehicle 102A can cover approximately twice the surface area in a single pass compared to the second vehicle 102B. In other examples, a different first operational width and/or a different second operational width may be used instead.

In the illustrated example of FIG. 5C, a first spacing between the paths 410 is approximately equal to the second operational width of the second implement 508B. As such, in some examples, the second vehicle 102B having the second operational width can cover the work area 402 by traversing each of the paths 410. However, given the first operational width of the first vehicle 102A, traversal of each of the paths 410 by the first vehicle 102A may lead to overlapping of coverage on the work area 402. Accordingly, in some examples, the first vehicle 102A can traverse one or more different paths to reduce and/or prevent overlapping of coverage.

In this example, the second vehicle 102B traverses and/or covers the second and third paths 410B, 410C, and the second vehicle 102B claims the fourth path 410D. Furthermore, the first vehicle 102A in this example traverses and/or covers a first example alternative path 512A that is approximately centrally positioned between the first path 410A and a seventh example path 410G, where the seventh path 410G is spaced apart from the first path 410A by the second operational width. In this example, when the first vehicle 102A traverses the first alternative path 512A, the first implement 508A covers an area of the work area 402 around each of the first and seventh paths 410A, 410G. As such, the path selection circuitry 106 determines that the first and seventh paths 410A, 410G, along with the first alternative path 512A, are covered by the first vehicle 102A. Furthermore, the path selection circuitry 106 determines that the first implement 508A of the first vehicle 102A covers an area that has a width approximately equal to the first operational width and that is approximately symmetric about the first alternative path 512A.

In some examples, the path selection circuitry 106 selects a next path to be traversed by the first vehicle 102A based on the available area 506 of the work area 402. In this example, the fifth and sixth paths 410E, 410F are available (e.g., not covered by at least one of the first vehicle 102A or the second vehicle 102B, and not claimed by at least one of the first vehicle 102A or the second vehicle 102B). However, based on the first operational width of the first implement 508A, the path selection circuitry 106 determines that overlapping of coverage may occur if the first vehicle 102A traverses the fifth path 410E. Furthermore, the path selection circuitry 106 determines that an example gap 514 in coverage may occur if the first vehicle 102A traverses the sixth path 410F, where the gap 514 is between the fifth path 410E and the claimed area 504.

In this example, to reduce overlapping and/or gaps in coverage, the path selection circuitry 106 generates and/or selects a second example alternative path 512B that is claimed by the first vehicle 102A. In the illustrated example of FIG. 5C, the second alternative path 512B is approximately centrally positioned between the fifth and sixth paths 410E, 410F. In some examples, when the first vehicle 102A traverses the second alternative path 512B, the first implement 508A covers an area of the work area 402 around each of the fifth and sixth paths 410E, 410F. As such, the path selection circuitry 106 determines that the fifth and sixth paths 410E, 410F, along with the second alternative path 512B, are claimed by the first vehicle 102A.

In some examples, the path selection circuitry 106 selects paths for the first vehicle 102A from a first set of track paths (e.g., the alternative paths 512), and select paths for the second vehicle 102B from a second set of track paths (e.g., the paths 410). In some examples, the path selection circuitry 106 generates and/or stores the first set of track paths and the second set of track paths corresponding to different operational widths. In some examples, at least some of the first set of track paths are different from the second set of track paths. In other examples, the first set of track paths are the same as the second set of track paths. In some examples, the path selection circuitry 106 generates and/or plans the first set of track paths and/or the second set of track paths prior to operation of the first and second vehicles 102A, 102B on the work area 402.

In some examples, the path selection circuitry 106 dynamically and/or periodically generates and/or modifies claimed paths during the operation of the first and second vehicles 102A, 102B. For example, the path selection circuitry 106 generates a first set of claimed paths to be traversed by the first vehicle 102A, where the first set of claimed paths includes claimed paths having a width equal to the first operational width of the first vehicle 102A. In this example, the first set of claimed paths includes three or fewer claimed paths. When the first vehicle 102A completes a traversal of one of the three or fewer claimed paths, the path selection circuitry 106 generates a new claimed path for the vehicle 102A to replace the traversed one of the three or fewer claimed paths. Stated differently, the path selection circuitry 106 periodically updates the first set of claimed paths to generate and/or claim at least one path and up to three paths ahead of the first vehicle 102A.

Similarly, the path selection circuitry 106 generates a second set of claimed paths to be traversed by the second vehicle 102B, where the second set of claimed paths includes claimed paths having a width equal to the second operational width of the second vehicle 102B. The path selection circuitry 106 periodically updates the second set of claimed paths by generating and/or claiming at least one path and up to three paths ahead of the second vehicle 102B. In such examples, the path selection circuitry 106 updates the second set of claimed paths based on the first set of claimed paths already claimed by the first vehicle 102A to reduce overlapping and/or gaps in coverage of the work area 402. While the path selection circuitry 106 in this example generates and/or claims at least one path and up to three paths for each of the first and second vehicles 102A, 102B, the path selection circuitry 106 can generate and/or claim a different number of paths (e.g., up to four paths, up to five paths, etc.) for the first and second vehicles 102A, 102B in other examples.

Figure 6:
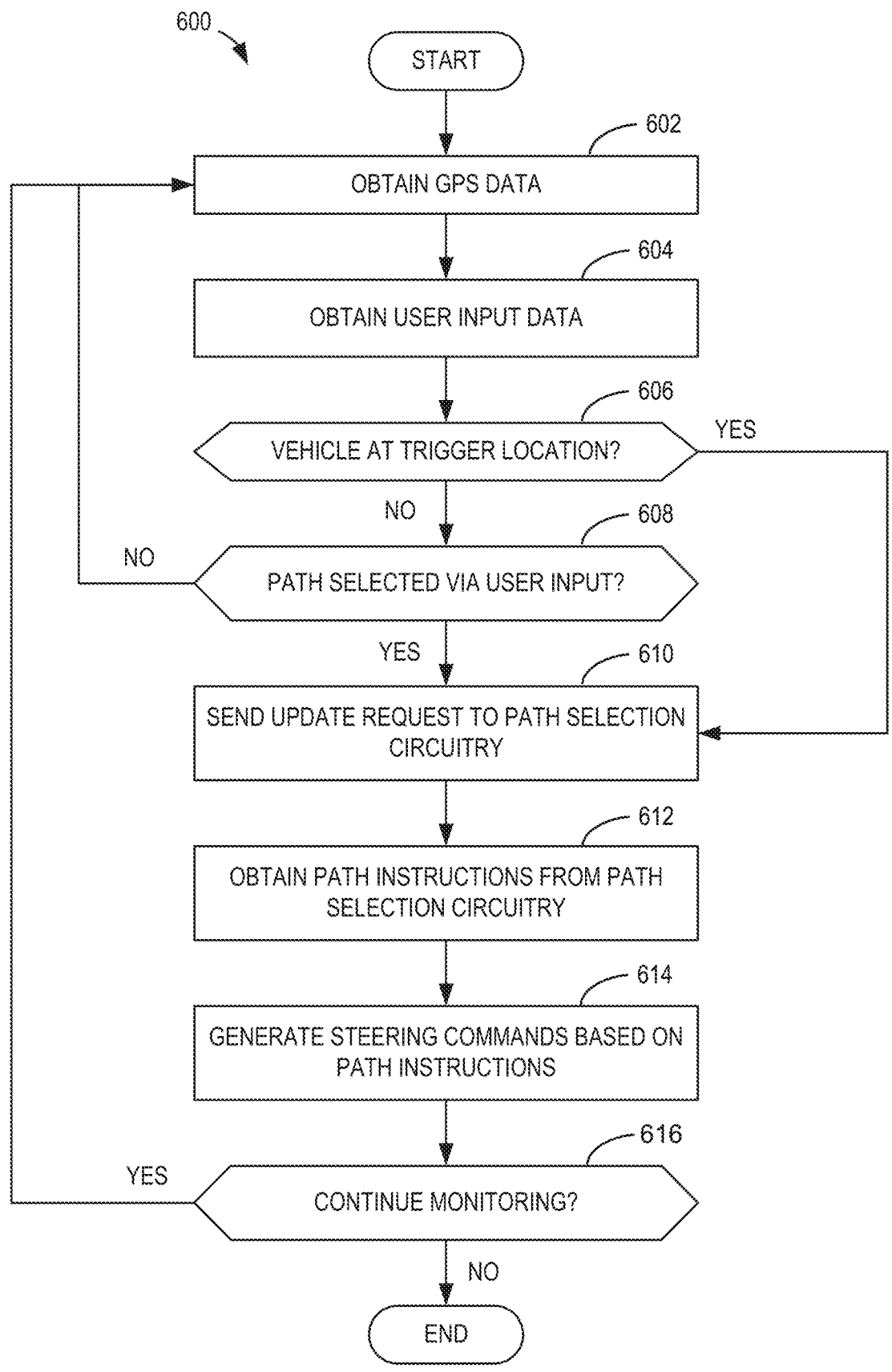
FIG. 6 is a flowchart representative of machine readable instructions that may be executed to implement the example vehicle control circuitry of FIG. 2.

A flowchart representative of example hardware logic circuitry, machine readable instructions, hardware implemented state machines, and/or any combination thereof for implementing the path selection circuitry 106 of FIG. 2 is shown in FIG. 6. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example vehicle control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by the vehicle control circuitry 104 of FIGS. 1 and/or 2 to control the vehicle 102 of FIG. 1. The machine readable instructions and/or operations 600 of FIG. 6 begin at block 602, at which the example vehicle control circuitry 104 obtains GPS data from the vehicle 102. For example, the example vehicle data interface circuitry 202 of FIG. 2 receives and/or otherwise obtains the GPS data collected by the GPS receiver 112 of FIG. 1. In some examples, the vehicle data interface circuitry 202 determines a current location of the vehicle 102 based on the GPS data.

At block 604, the example vehicle control circuitry 104 obtains user input data from the vehicle 102. For example, the vehicle data interface circuitry 202 receives and/or otherwise obtains the user input data from the user interface 114 of FIG. 1. In some examples, the user input data includes one or more paths and/or identifiers of the one or more paths selected by an operator of the vehicle 102 via the user interface 114, and/or includes a request to select a new path for the vehicle 102.

At block 606, the example vehicle control circuitry 104 determines whether the vehicle 102 is at a trigger location. For example, the example trigger monitoring circuitry 204 of FIG. 2 determines, based on the current location of the vehicle 102, whether the vehicle 102 is at the trigger location (e.g., at an end of a current path of the vehicle 102, at a midpoint of the current path of the vehicle 102, etc.). In response to the trigger monitoring circuitry 204 determining that the vehicle 102 is at the trigger location (e.g., block 606 returns a result of YES), control proceeds to block 610. Alternatively, in response to the trigger monitoring circuitry 204 determining that the vehicle 102 is not at the trigger location (e.g., block 606 returns a result of NO), control proceeds to block 608.

At block 608, the example vehicle control circuitry 104 determines whether a path is selected via user input. For example, the trigger monitoring circuitry 204 determines, based on the user input data, whether the operator of the vehicle 102 has selected and/or otherwise claimed a path via the user interface 114. In response to the trigger monitoring circuitry 204 determining that a path has been selected via user input (e.g., block 608 returns a result of YES), control proceeds to block 610. Alternatively, in response to the trigger monitoring circuitry 204 determining that a path has not been selected via user input (e.g., block 608 returns a result of NO), control returns to block 602.

At block 610, the example vehicle control circuitry 104 sends one or more update requests 316 of FIG. 3 to the example path selection circuitry 106 of FIGS. 1 and/or 3. For example, the example network interface circuitry 210 of FIG. 2 sends the update request 316 to the example path selection circuitry 106 via the network 108 of FIG. 1, where the update request 316 includes the current location of the vehicle 102 and/or the user input data. In some examples, the update request 316 includes a request to select a new path for the vehicle 102. In other examples, the update request 316 includes one or more paths and/or identifiers of the one or more paths claimed by the operator of the vehicle 102 via the user interface 114.

At block 612, the example vehicle control circuitry 104 obtains the example path instructions 318 of FIG. 3 from the example path selection circuitry 106. For example, the network interface circuitry 210 receives and/or otherwise obtains the path instructions 318 from the path selection circuitry 106, where the path instructions 318 include updated path and/or coverage maps. In some examples, the path instructions 318 include identifiers of one or more claimed paths to be traversed by the vehicle 102, where the one or more claimed paths are selected manually (e.g., via the user interface 114) and/or selected via the path selection circuitry 106 based on the current location of the vehicle 102.

At block 614, the example vehicle control circuitry 104 generates the example steering commands 212 of FIG. 2 based on the example path instructions 318. For example, the example steering control circuitry 208 of FIG. 2 determines, based on the path instruction 318, one or more paths (e.g., current and/or claimed paths) to be traversed by the vehicle 102, and generates the steering commands 212 to steer the vehicle 102 along the one or more paths.

At block 616, the example vehicle control circuitry 104 determines whether to continue monitoring steering of the vehicle 102. For example, the vehicle data interface circuitry 202 determines whether to continue monitoring based on whether there are one or more available paths in the path map and/or the coverage map. In response to the vehicle data interface circuitry 202 determining to continue monitoring (e.g., block 616 returns a result of YES), control returns to block 602. Alternatively, in response to the vehicle data interface circuitry 202 determining not to continue monitoring (e.g., block 616 returns a result of NO), control ends.

Figure 7:
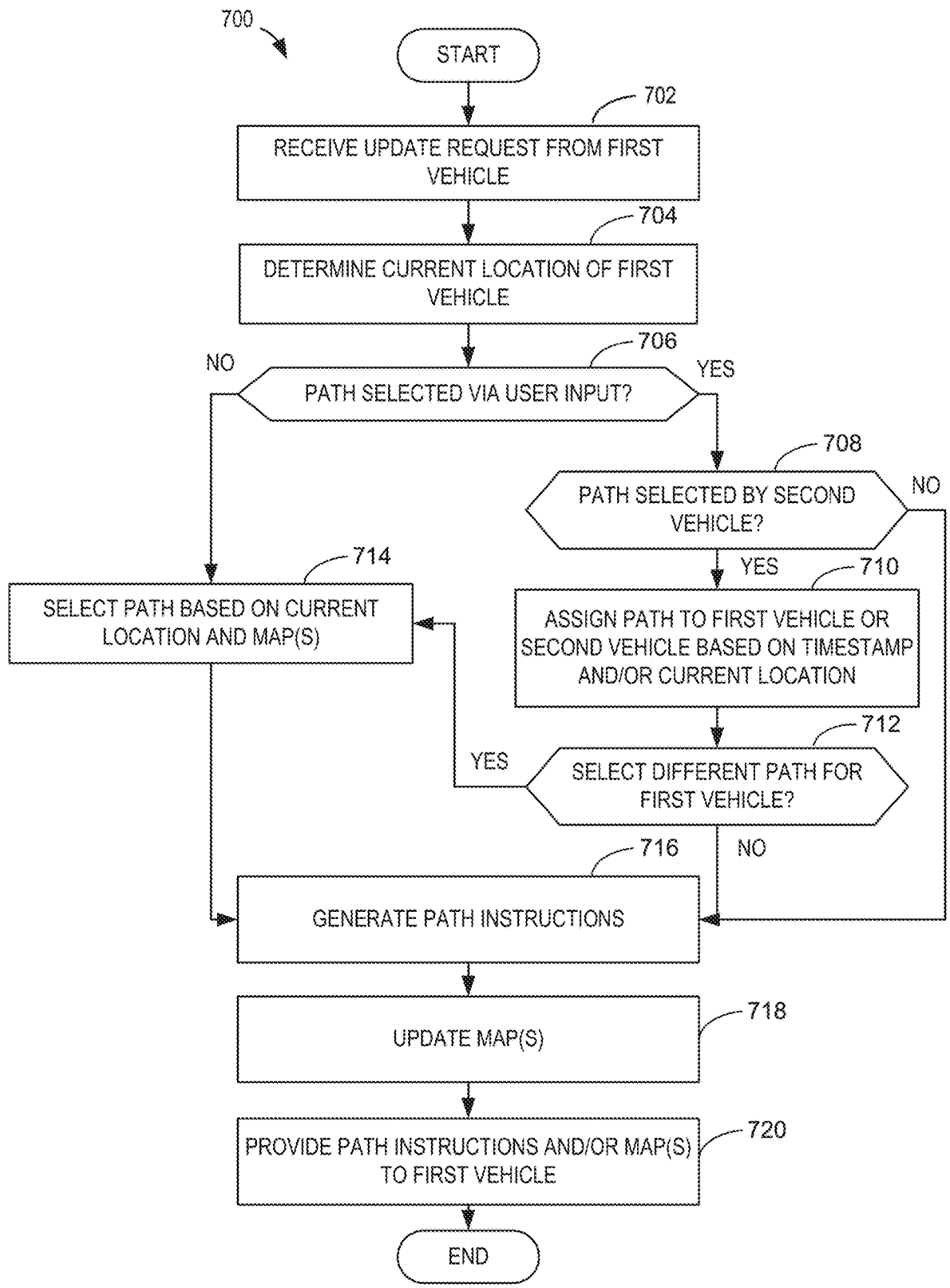
FIG. 7 is a flowchart representative of machine readable instructions that may be executed to implement the example path selection circuitry of FIG. 3.

A flowchart representative of example hardware logic circuitry, machine readable instructions, hardware implemented state machines, and/or any combination thereof for implementing the path selection circuitry 106 of FIG. 3 is shown in FIG. 7. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example path selection circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

FIG. 7 is a flowchart representative of example machine readable instructions and/or example operations 700 that may be executed and/or instantiated by the path selection circuitry 106 of FIGS. 1 and/or 3 to select one or more paths for the vehicle 102 (e.g., the first vehicle 102A) of FIG. 1. The machine readable instructions and/or operations 700 of FIG. 7 begin at block 702, at which the example path selection circuitry 106 receives the update requests 316 of FIG. 3 from the first vehicle 102A. For example, the example input interface circuitry 302 of FIG. 3 receives and/or otherwise obtains the update request 316 from the vehicle control circuitry 104 of FIGS. 1 and/or 2.

At block 704, the example path selection circuitry 106 determines a current location of the first vehicle 102A. For example, the example input interface circuitry 302 determines the current location of the first vehicle 102A based on vehicle data obtained from the update request 316.

At block 706, the example path selection circuitry 106 determines whether a path has been selected via user input. For example, the example input interface circuitry 302 determines, based on the update request 316, whether a path has been selected and/or otherwise claimed by an operator of the first vehicle 102A via the user interface 114 of FIG. 1. In response to the input interface circuitry 302 determining that a path has been selected via user input (e.g., block 706 returns a result of YES), control proceeds to block 708. Alternatively, in response to the input interface circuitry 302 determining that a path has not been selected (e.g., block 706 returns a result of NO), control proceeds to block 714.

At block 708, the example path selection circuitry 106 determines whether the path has been selected by a different vehicle (e.g., the second vehicle 102B of FIG. 1). For example, in response to the example conflict management circuitry 308 of FIG. 3 determining that the path is selected and/or otherwise claimed by the second vehicle 102B (e.g., block 708 returns a result of YES), control proceeds to block 710. Alternatively, in response to the conflict management circuitry 308 determining that the path is not selected by the second vehicle 102B (e.g., block 708 returns a result of NO), control proceeds to block 716.

At block 710, the example path selection circuitry 106 assigns the selected path to the first vehicle 102A or the second vehicle 102B based on timestamps associated with the update requests 316 and/or based on current locations of the first and second vehicles 102A, 102B. For example, the conflict management circuitry 308 obtains a first timestamp from a first one of the update requests 316 associated with the first vehicle 102A, and obtains a second timestamp from a second one of the update requests 316 associated with the second vehicle 102B. In such examples, the conflict management circuitry 308 assigns the selected path to the first vehicle 102A or the second vehicle 102B corresponding to an earlier one of the first timestamp or the second timestamp. In other examples, the example distance calculation circuitry 306 of FIG. 3 calculates a first distance between the selected path and a current location of the first vehicle 102A, and calculates a second distance between the selected path and a current location of the second vehicle 102B. In such examples, the conflict management circuitry 308 assigns the selected path to the first vehicle 102A or the second vehicle 102B corresponding to a lesser one of the first distance or the second distance.

At block 712, the example path selection circuitry 106 determines whether to select a different path for the first vehicle 102A. For example, the conflict management circuitry 308 determines a different path is to be selected for the first vehicle 102A when the selected path is assigned to the second vehicle 102B. In response to the conflict management circuitry 308 determining that a different path is to be selected for the first vehicle 102A (e.g., block 712 returns a result of YES), control proceeds to block 714. Alternatively, in response to the conflict management circuitry 308 determining that a different path is not to be selected for the first vehicle 102A (e.g., block 712 returns a result of NO), control proceeds to block 716.

At block 714, the example path selection circuitry 106 selects a new path for the first vehicle 102A based on the current location of the first vehicle 102A and based on one or more maps stored in the example map database 312 of FIG. 3. For example, the example path instruction generation circuitry 310 of FIG. 3 identifies available paths based on information from a path map and/or a coverage map stored in the map database 312. In some examples, the distance calculation circuitry 306 calculates distances between the current location of the first vehicle 102A and the available paths, and the path instruction generation circuitry 310 selects a path from the available paths that corresponds to a smallest one of the calculated distances.

At block 716, the example path selection circuitry 106 generates the example path instructions 318 of FIG. 3. For example, the path instruction generation circuitry 310 generates the path instructions 318 to include the selected path and/or an identifier of the selected path for the first vehicle 102A.

At block 718, the example path selection circuitry 106 updates the one or more maps stored in the example map database 312. For example, the example update circuitry 304 of FIG. 3 updates the path map to indicate that the selected path is claimed by the first vehicle 102A. Furthermore, the update circuitry 304 updates the coverage map to indicate than coverage corresponding to the selected path is claimed by the first vehicle 102A. In some examples, the update circuitry 304 further updates the path map and/or the coverage map to include the current location of the first vehicle 102A.

At block 720, the example path selection circuitry 106 provides the path instructions 318 and/or the one or more maps to the first vehicle 102A. For example, the path instruction generation circuitry 310 provides the path instructions 318 to the first vehicle control circuitry 104A of FIG. 1 for use in steering the first vehicle 102A. In some examples, the path instruction generation circuitry 310 also provides the updated path map and/or the updated coverage map in the path instructions 318 to the first vehicle 102A.

Figure 8:
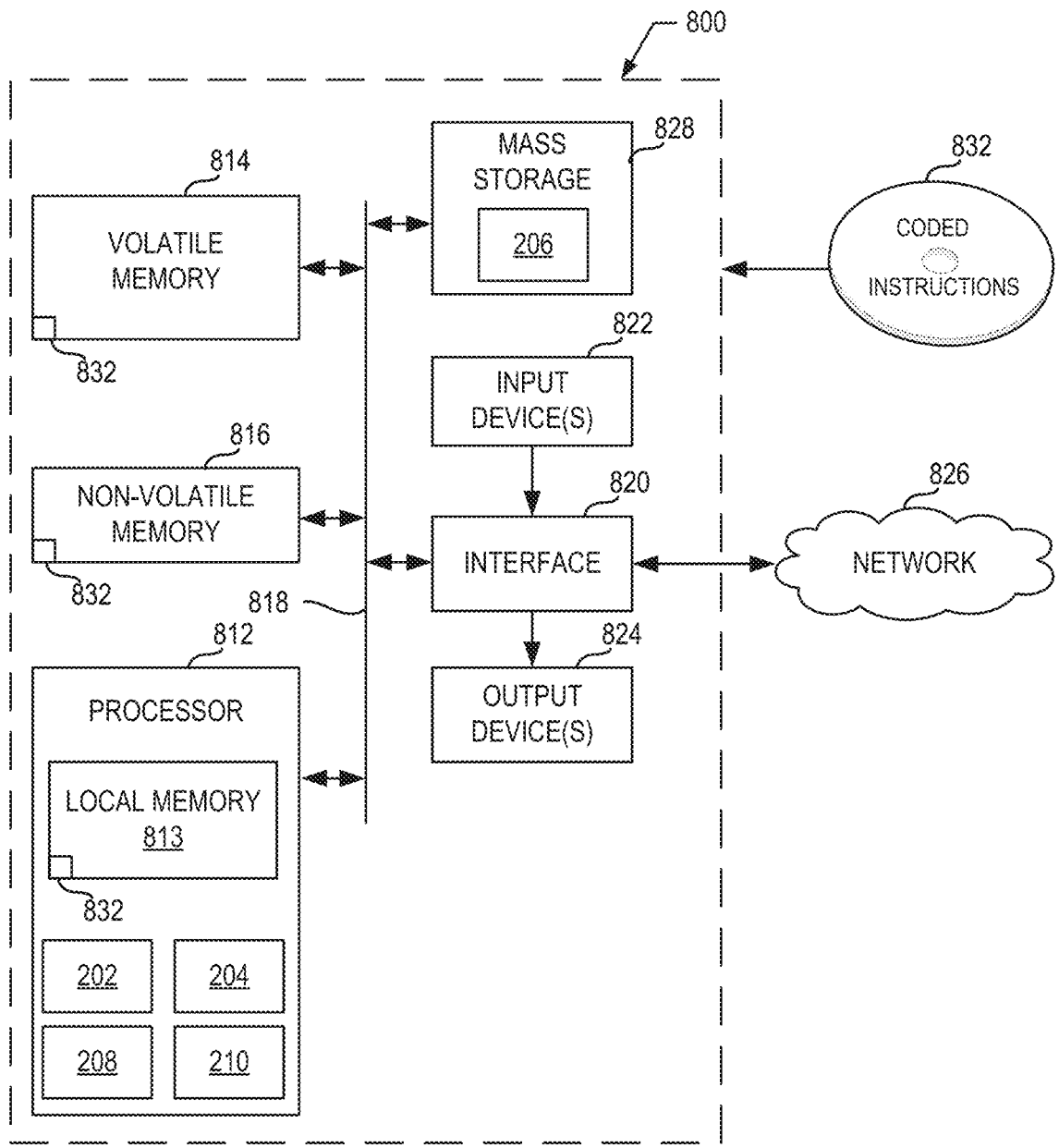
FIG. 8 is a block diagram of an example processing platform structured to execute the instructions of FIG. 6 to implement the example vehicle control circuitry of FIG. 2.

FIG. 8 is a block diagram of an example processor platform 800 structured to execute and/or instantiate the machine readable instructions and/or operations of FIG. 6 to implement the vehicle control circuitry 104 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example vehicle data interface circuitry 202, the example trigger monitoring circuitry 204, the example vehicle data database 206, the example steering control circuitry 208, and the example network interface circuitry 210.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 6, may be stored in the mass storage device 828, in the volatile memory 814, in the non-volatile memory 816, and/or on a removable non-transitory computer readable storage medium such as a CD or DVD.

Figure 9:
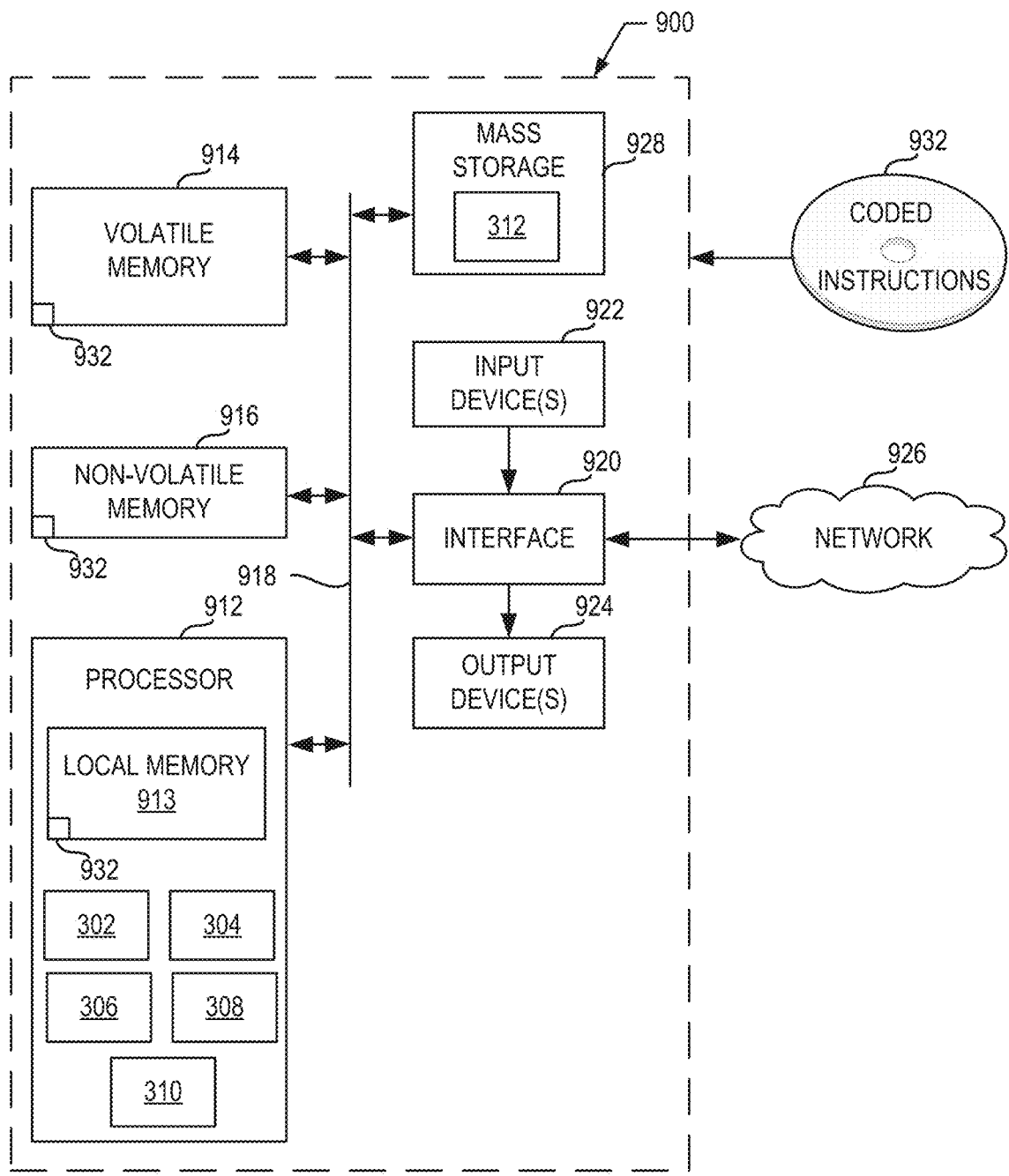
FIG. 9 is a block diagram of an example processing platform structured to execute the instructions of FIG. 7 to implement the example path selection circuitry of FIG. 3.

FIG. 9 is a block diagram of an example processor platform 900 structured to execute and/or instantiate the machine readable instructions and/or operations of FIG. 7 to implement the path selection circuitry 106 of FIG. 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example input interface circuitry 302, the example update circuitry 304, the example distance calculation circuitry 306, the example conflict management circuitry 308, the example path instruction generation circuitry 310, and the example map database 312.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIG. 7, may be stored in the mass storage device 928, in the volatile memory 914, in the non-volatile memory 916, and/or on a removable non-transitory computer readable storage medium such as a CD or DVD.

Figure 10:
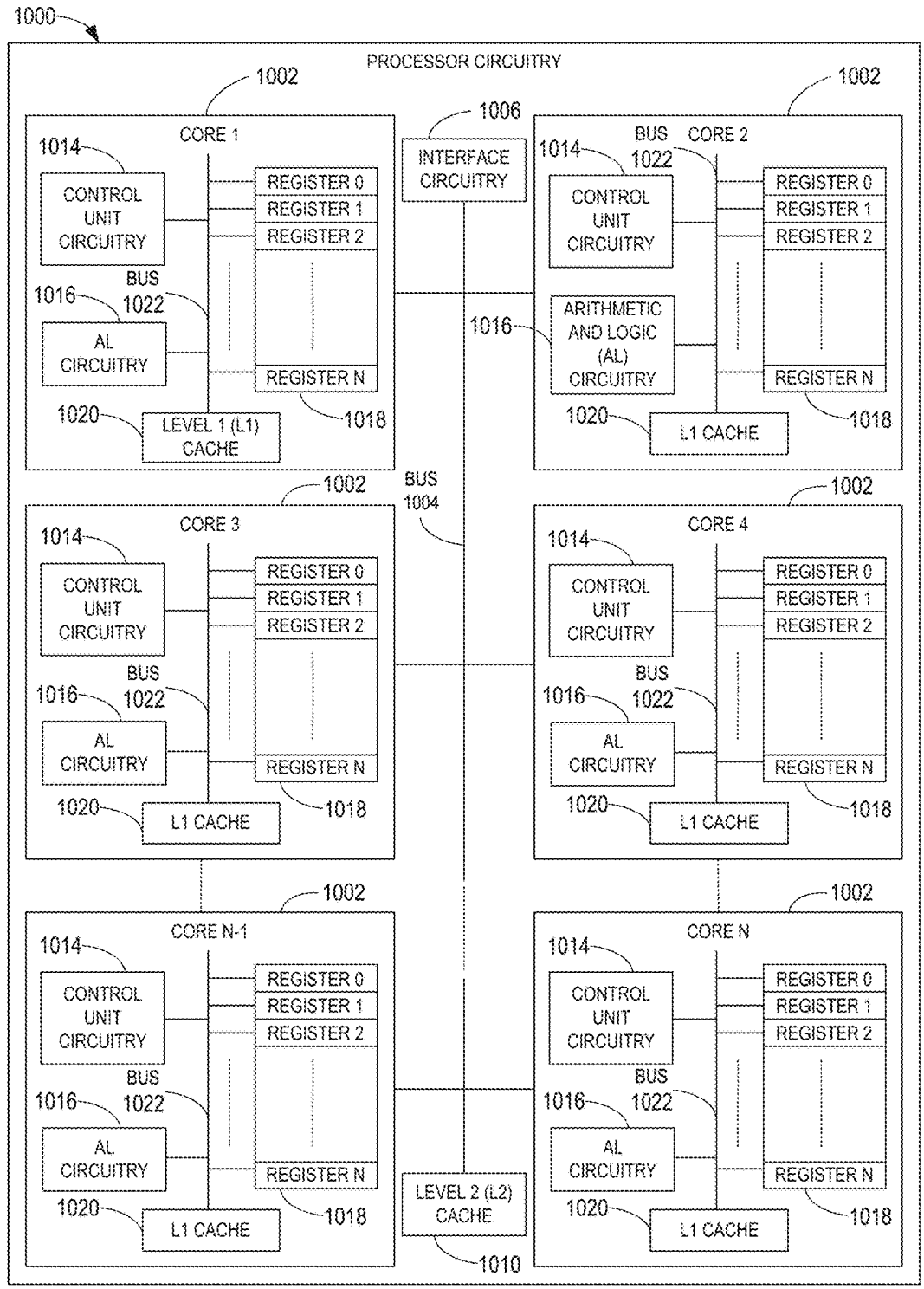
FIG. 10 is a block diagram of an example implementation of the processor circuitry of FIGS. 8 and/or 9.

FIG. 10 is a block diagram of an example implementation of the processor circuitry 812 of FIG. 8 and/or the processor circuitry 912 of FIG. 9. In this example, the processor circuitry 812 of FIG. 8 and/or the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6 and/or 7.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 814, 816 of FIG. 8 and/or the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1004 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
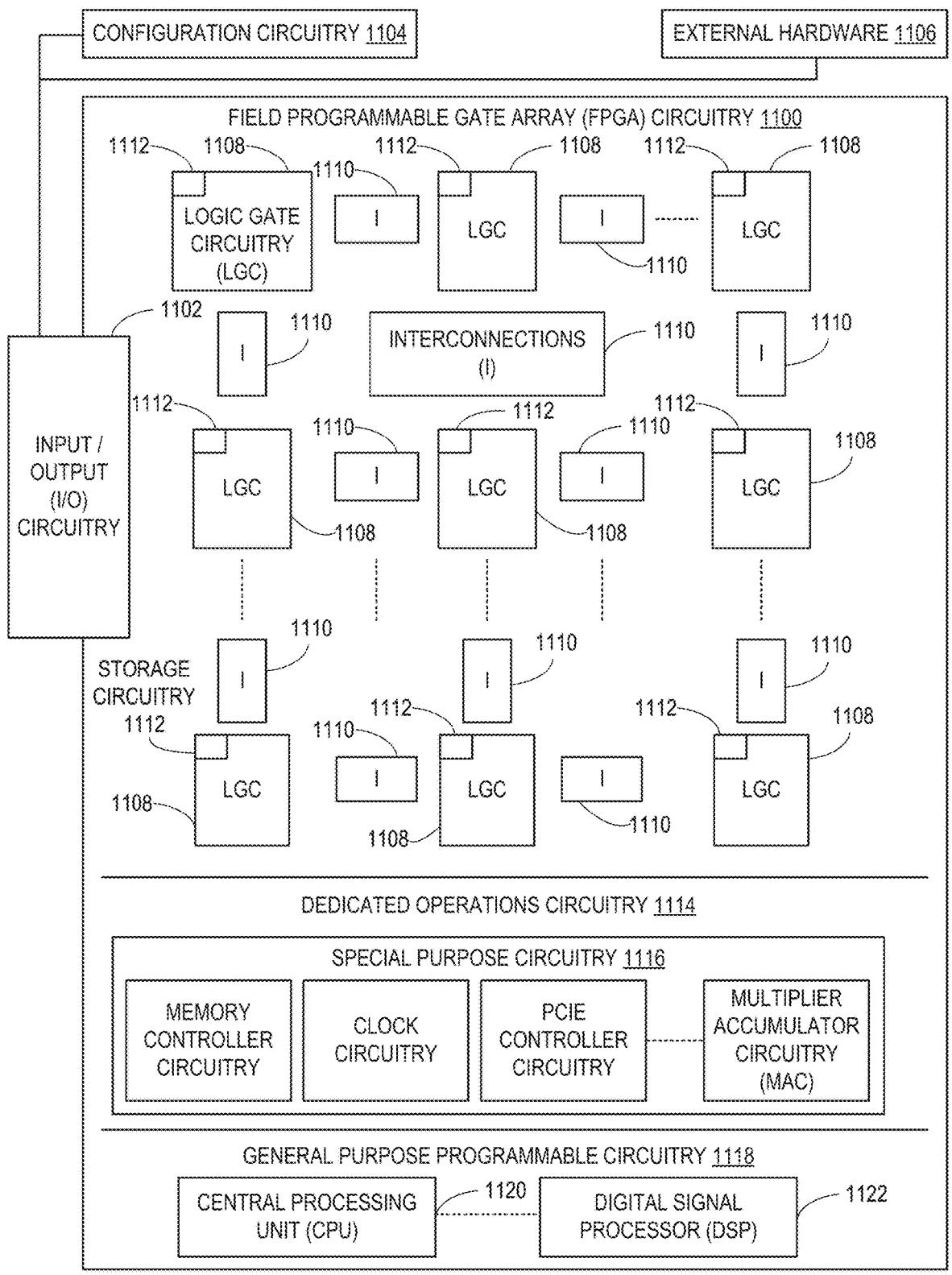
FIG. 11 is a block diagram of another example implementation of the processor circuitry of FIGS. 8 and/or 9.

FIG. 11 is a block diagram of another example implementation of the processor circuitry 812 of FIG. 8 and/or the processor circuitry 912 of FIG. 9. In this example, the processor circuitry 812 and/or the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 6 and/or 7 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 6 and/or 7. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 6 and/or 7. As such, the FPGA circuitry 1100 may be structured to effectively instantiate some or all of the machine readable instructions of the flowcharts of FIGS. 6 and/or 7 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 6 and/or 7 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1100 of FIG. 11. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 6 and/or 7 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 812 of FIG. 8 and/or the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 812 of FIG. 8 and/or the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 6 and/or 7 may be executed by one or more of the cores 1002 of FIG. 10 and a second portion of the machine readable instructions represented by the flowcharts of FIGS. 6 and/or 7 may be executed by the FPGA circuitry 1100 of FIG. 11.

In some examples, the processor circuitry 812 of FIG. 8 and/or the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 812 of FIG. 8 and/or the processor circuitry 912 of FIG. 9, which may be in one or more packages. For example, the XPU may include a CPU in one package, a DSP in another package, a GPU in yet another package, and an FPGA in still yet another package.

Figure 12:
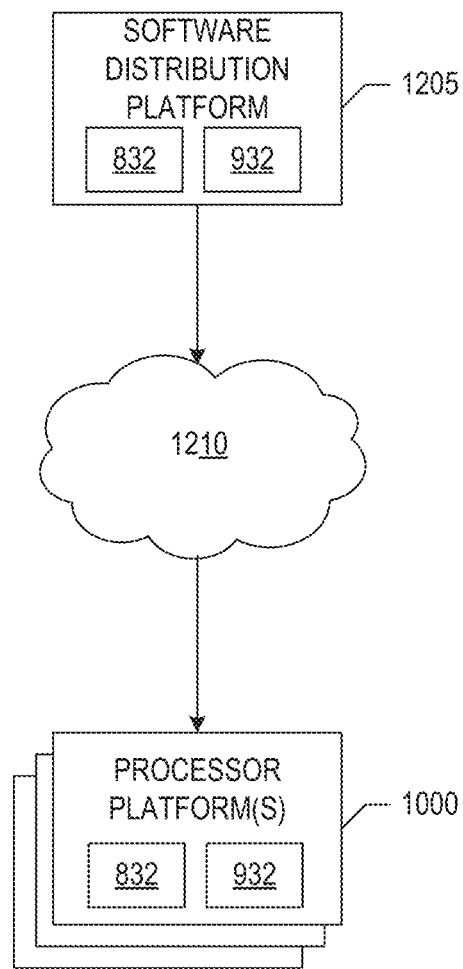
FIG. 12 is a block diagram of an example software distribution platform (e.g., one or more servers) to distribute software (e.g., software corresponding to the example machine readable instructions of FIGS. 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 832 of FIG. 8 and/or the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 832 of FIG. 8 and/or the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 832 of FIG. 8 and/or the example machine readable instructions 932 of FIG. 9. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 and/or the example machine readable instructions 932 from the software distribution platform 1205. For example, the software, which may correspond to the example machine readable instructions 832 of FIG. 8 and/or the example machine readable instructions 932 of FIG. 9, may be downloaded to the example processor platform 800 and/or the example processor platform 900, which is/are to execute the machine readable instructions 832 and/or the machine readable instruction 932 to implement the vehicle control circuitry 104 of FIG. 2 and/or the path selection circuitry 106 of FIG. 3. In some example, one or more servers of the software distribution platform 1205 periodically offer, transmit, and/or force updates to the software (e.g., the example machine readable instructions 832 of FIG. 8 and/or the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that select a path for a vehicle based on whether the path has been claimed and/or covered by one or more vehicles in a field. The disclosed systems, methods, apparatus, and articles of manufacture continuously update one or more maps indicating whether paths and/or areas of the field are claimed, covered, or available, and provide the one or maps to the one or more vehicles for use in generating steering commands. As such, examples disclosed herein enable dynamic path planning for the one or more vehicles, thereby reducing inefficiencies that may result from repeat operations on the field and/or missing coverage of some portions of the field. The disclosed systems, methods, apparatus, and articles of manufacture improve the efficiency of using a computing device by enabling automatic selection of a path for a vehicle when the vehicle is at a trigger location, thus reducing a need for manual input from an operator of the vehicle. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to select track paths for one or more vehicles in a field are disclosed herein. Further examples and combinations thereof include the following:

Example 1 includes an apparatus comprising input interface circuitry to obtain a request for a first track path for a first vehicle, path instruction generation circuitry to, in response to the request obtain information defining a plurality of track paths in a field, and select, based on the request, the first track path from the plurality of track paths, and update circuitry to update the information to indicate that the first track path is claimed by the first vehicle.

Example 2 includes the apparatus of example 1, wherein the path instruction generation circuitry is to identify available ones of the plurality of track paths based on whether each of the plurality of track paths has been at least one of covered by one or more vehicles or claimed by the one or more vehicles.

Example 3 includes the apparatus of example 2, wherein the update circuitry is to determine covered areas and claimed areas of the field based on (a) the plurality of track paths and (b) widths of implements of the one or more vehicles, the path instruction generation circuitry to identify available ones of the plurality of track paths based on the covered areas and the claimed areas.

Example 4 includes the apparatus of example 3, wherein a first implement of the first vehicle has a first width and at least one second implement of the one or more vehicles has a second width different from the first width.

Example 5 includes the apparatus of example 1, wherein the request includes at least one of a timestamp associated with the request, an identifier associated with the first track path, or a current location of the first vehicle.

Example 6 includes the apparatus of example 5, further including distance calculation circuitry to calculate distances between the current location of the first vehicle and the plurality of track paths, the path instruction generation circuitry to select the first track path based on the calculated distances.

Example 7 includes the apparatus of example 5, wherein the request is a first request, the timestamp is a first timestamp, further including conflict management circuitry to obtain the first timestamp associated with the first request, obtain a second timestamp associated with a second request from a second vehicle, the second request including the identifier associated with the first track path, and assign the first track path to one of the first vehicle or the second vehicle by comparing the first timestamp to the second timestamp.

Example 8 includes the apparatus of example 1, wherein the path instruction generation circuitry is to provide the updated information to the first vehicle to cause steering of the first vehicle along the first track path.

Example 9 includes a non-transitory computer readable medium comprising instructions that, when executed, cause at least one processor to at least obtain a request for a first track path for a first vehicle, obtain, in response to the request, information defining a plurality of track paths in a field, select, based on the request, the first track path from the plurality of track paths, and update the information to indicate that the first track path is claimed by the first vehicle.

Example 10 includes the non-transitory computer readable medium of example 9, wherein the instructions, when executed, cause the at least one processor to identify available ones of the plurality of track paths based on whether each of the plurality of track paths has been at least one of covered by one or more vehicles or claimed by the one or more vehicles.

Example 11 includes the non-transitory computer readable medium of example 10, wherein the instructions, when executed, cause the at least one processor to determine covered areas and claimed areas of the field based on (a) the plurality of track paths and (b) widths of implements of the one or more vehicles, the at least one processor to identify available ones of the plurality of track paths based on the covered areas and the claimed areas.

Example 12 includes the apparatus of example 3, wherein the instructions, when executed, cause the at least one processor to determine the covered areas and the claimed areas based on a first implement of the first vehicle having a first width and at least one second implement of the one or more vehicles having a second width different from the first width.

Example 13 includes the non-transitory computer readable medium of example 9, wherein the request includes at least one of a timestamp associated with the request, an identifier associated with the first track path, or a current location of the first vehicle.

Example 14 includes the non-transitory computer readable medium of example 13, wherein the instructions, when executed, cause the at least one processor to calculate distances between the current location of the first vehicle and the plurality of track paths, the at least one processor to select the first track path based on the calculated distances.

Example 15 includes the non-transitory computer readable medium of example 13, wherein the request is a first request, the timestamp is a first timestamp, the instructions, when executed, cause the at least one processor to obtain the first timestamp associated with the first request, obtain a second timestamp associated with a second request from a second vehicle, the second request including the identifier associated with the first track path, and assign the first track path to one of the first vehicle or the second vehicle by comparing the first timestamp to the second timestamp.

Example 16 includes the non-transitory computer readable medium of example 9, wherein the instructions, when executed, cause the at least one processor to provide the updated information to the first vehicle to cause steering of the first vehicle along the first track path.

Example 17 includes an apparatus comprising means for obtaining to obtain a request for a first track path for a first vehicle, means for selecting to, in response to the request obtain information defining a plurality of track paths in a field, and select, based on the request, the first track path the plurality of track paths, and means for updating to update the information to indicate that the first track path is claimed by the first vehicle.

Example 18 includes the apparatus of example 17, wherein the means for selecting is to identify available ones of the plurality of track paths based on whether each of the plurality of track paths has been at least one of covered by one or more vehicles or claimed by the one or more vehicles.

Example 19 includes the apparatus of example 18, wherein the means for updating is to determine covered areas and claimed areas of the field based on (a) the plurality of track paths and (b) widths of implements of the one or more vehicles, the means for selecting to identify available ones of the plurality of track paths based on the covered areas and the claimed areas.

Example 20 includes the apparatus of example 19, wherein a first implement of the first vehicle has a first width and at least one second implement of the one or more vehicles has a second width different from the first width.

Example 21 includes the apparatus of example 17, wherein the request includes at least one of a timestamp associated with the request, an identifier associated with the first track path, or a current location of the first vehicle.

Example 22 includes the apparatus of example 21, further including means for calculating to calculate distances between the current location of the first vehicle and the plurality of track paths, the means for selecting to select the first track path based on the calculated distances.

Example 23 includes the apparatus of example 21, wherein the request is a first request, the timestamp is a first timestamp, further including means for managing conflict to obtain the first timestamp associated with the first request, obtain a second timestamp associated with a second request from a second vehicle, the second request including the identifier associated with the first track path, and assign the first track path to one of the first vehicle or the second vehicle by comparing the first timestamp to the second timestamp.

Example 24 includes the apparatus of example 17, wherein the means for selecting is to provide the updated information to the first vehicle to cause steering of the first vehicle along the first track path.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   instructions; and
   processor circuitry to execute the instructions to at least:
      obtain a request for a first track path for a first vehicle, the first track path from a plurality of predetermined track paths determined based on a second implement width of a second vehicle, the first vehicle and the second vehicle operating simultaneously in a field;
      determine, based on a first implement width of the first vehicle, whether at least one of a coverage overlap or a coverage gap expected to occur when the first vehicle traverses the first track path;
      when the at least one of the coverage overlap or the coverage gap is expected to occur, generate a second track path different from the plurality of predetermined track paths, the second track path positioned between adjacent ones of the predetermined track paths;
      obtain information defining the plurality of predetermined track paths in the field;
      select, based on the determination, one of the first track path or the second track path;
      update the information to indicate that the one of the first track path or the second track path is claimed by the first vehicle; and
      provide the updated information to the first vehicle to cause steering of the first vehicle along the one of the first track path or the second track path.

2. The apparatus of claim 1, wherein the processor circuitry is to identify available ones of the plurality of predetermined track paths based on whether each of the plurality of predetermined track paths has been at least one of covered by one or more vehicles or claimed by the one or more vehicles.

3. The apparatus of claim 2, wherein the processor circuitry is to:
   determine covered areas and claimed areas of the field based on (a) the plurality of predetermined track paths and (b) widths of implements of the one or more vehicles; and
   identify available ones of the plurality of predetermined track paths based on the covered areas and the claimed areas.

4. The apparatus of claim 3, wherein at least one second implement of the one or more vehicles has a second implement width different from the first implement width.

5. The apparatus of claim 1, wherein the request includes at least one of a timestamp associated with the request, an identifier associated with the first track path, or a current location of the first vehicle.

6. The apparatus of claim 5, wherein the processor circuitry is to:
   calculate distances between the current location of the first vehicle and the plurality of predetermined track paths; and
   select the one of the first track path or the second track path based on the calculated distances.

7. The apparatus of claim 5, wherein the request is a first request, the timestamp is a first timestamp, and the processor circuitry is to:
  obtain the first timestamp associated with the first request;
  obtain a second timestamp associated with a second request from the second vehicle, the second request including the identifier associated with the first track path; and
  assign the first track path to one of the first vehicle or the second vehicle by comparing the first timestamp to the second timestamp.

8. A non-transitory computer readable medium comprising instructions that, when executed, cause at least one processor to at least:
  obtain a request for a first track path for a first vehicle, the first track path from a plurality of predetermined track paths determined based on a second implement width of a second vehicle, the first vehicle and the second vehicle operating simultaneously in a field;
  determine, based on a first implement width of the first vehicle, whether at least one of a coverage overlap or a coverage gap expected to occur when the first vehicle traverses the first track path;
  when the at least one of the coverage overlap or the coverage gap is expected to occur, generate a second track path different from the plurality of predetermined track paths, the second track path positioned between adjacent ones of the predetermined track paths;
  obtain information defining the plurality of predetermined track paths in the field;
  select, based on the determination, one of the first track path or the second track path;
  update the information to indicate that the one of the first track path or the second track path is claimed by the first vehicle; and
  provide the updated information to the first vehicle to cause steering of the first vehicle along the one of the first track path or the second track path.

9. The non-transitory computer readable medium of claim 8, wherein the instructions, when executed, cause the at least one processor to identify available ones of the plurality of predetermined track paths based on whether each of the plurality of predetermined track paths has been at least one of covered by one or more vehicles or claimed by the one or more vehicles.

10. The non-transitory computer readable medium of claim 9, wherein the instructions, when executed, cause the at least one processor to determine covered areas and claimed areas of the field based on (a) the plurality of predetermined track paths and (b) widths of implements of the one or more vehicles, the at least one processor to identify available ones of the plurality of predetermined track paths based on the covered areas and the claimed areas.

11. The non-transitory computer readable medium of claim 10, wherein the instructions, when executed, cause the at least one processor to determine the covered areas and the claimed areas based on at least one second implement of the one or more vehicles having a second implement width different from the first implement width.

12. The non-transitory computer readable medium of claim 8, wherein the request includes at least one of a timestamp associated with the request, an identifier associated with the first track path, or a current location of the first vehicle.

13. The non-transitory computer readable medium of claim 12, wherein the instructions, when executed, cause the at least one processor to calculate distances between the current location of the first vehicle and the plurality of predetermined track paths, the at least one processor to select the one of the first track path or the second track path based on the calculated distances.

14. The non-transitory computer readable medium of claim 12, wherein the request is a first request, the timestamp is a first timestamp, the instructions, when executed, cause the at least one processor to:
  obtain the first timestamp associated with the first request;
  obtain a second timestamp associated with a second request from the second vehicle, the second request including the identifier associated with the first track path; and
  assign the first track path to one of the first vehicle or the second vehicle by comparing the first timestamp to the second timestamp.

15. An apparatus comprising:
  means for obtaining to obtain, by processor circuitry, a request for a first track path for a first vehicle, the first track path from a plurality of predetermined track paths determined based on a second implement width of a second vehicle, the first vehicle and the second vehicle operating simultaneously in a field;
  means for selecting to:
    determine, by the processor circuitry based on a first implement width of the first vehicle, whether at least one of a coverage overlap or a coverage gap expected to occur when the first vehicle traverses the first track path;
    when the at least one of the coverage overlap or the coverage gap is expected to occur, generate, by the processor circuitry, a second track path different from the plurality of predetermined track paths, the second track path positioned between adjacent ones of the predetermined track paths;
    obtain, by the processor circuitry, information defining the plurality of predetermined track paths in the field; and
    select, by the processor circuitry, one of the first track path or the second track path based on the determination; and
  means for updating, by the processor circuitry, the information to indicate that the first track path is claimed by the first vehicle, the means for selecting to provide, by the processor circuitry, the updated information to the first vehicle to cause steering of the first vehicle along the first track path.

16. The apparatus of claim 15, wherein the means for selecting is to identify, by the processor circuitry, available ones of the plurality of predetermined track paths based on whether each of the plurality of predetermined track paths has been at least one of covered by one or more vehicles or claimed by the one or more vehicles.

17. The apparatus of claim 16, wherein the means for updating is to determine, by the processor circuitry, covered areas and claimed areas of the field based on (a) the plurality of predetermined track paths and (b) widths of implements of the one or more vehicles, the means for selecting to identify, by the processor circuitry, available ones of the plurality of predetermined track paths based on the covered areas and the claimed areas.

18. The apparatus of claim 17, wherein at least one second implement of the one or more vehicles has a second implement width different from the first implement width.

19. The apparatus of claim 15, wherein the request includes at least one of a timestamp associated with the request, an identifier associated with the first track path, or a current location of the first vehicle.

20. The apparatus of claim 19, further including means for calculating to calculate, by the processor circuitry, distances between the current location of the first vehicle and the plurality of predetermined track paths, the means for selecting to select, by the processor circuitry, the one of the first track path or the second track path based on the calculated distances.

21. The apparatus of claim 19, wherein the request is a first request, the timestamp is a first timestamp, further including means for managing conflict to:
   obtain, by the processor circuitry, the first timestamp associated with the first request;
   obtain, by the processor circuitry, a second timestamp associated with a second request from the second vehicle, the second request including the identifier associated with the first track path; and
   assign, by the processor circuitry, the first track path to one of the first vehicle or the second vehicle by comparing the first timestamp to the second timestamp.

\* \* \* \* \*